(12) United States Patent
Narayanan et al.

(10) Patent No.: US 7,535,905 B2
(45) Date of Patent: May 19, 2009

(54) SIGNING AND VALIDATING SESSION INITIATION PROTOCOL ROUTING HEADERS

(75) Inventors: Sankaran Narayanan, Bellevue, WA (US); Jeremy Thomas Buch, Redmond, WA (US); Vadim Eydelman, Redmond, WA (US); Jinyan Su, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 10/815,232

(22) Filed: Mar. 31, 2004

(65) Prior Publication Data

US 2005/0220095 A1   Oct. 6, 2005

(51) Int. Cl.
*H04L 12/56* (2006.01)
(52) U.S. Cl. .................................. 370/392; 713/168
(58) Field of Classification Search ............... 370/466, 370/389; 709/229, 246
See application file for complete search history.

(56) References Cited

U.S. PATENT DOCUMENTS

| | | | |
|---|---|---|---|
| 6,275,937 B1 | 8/2001 | Hailpern et al. | |
| 6,389,532 B1 | 5/2002 | Gupta et al. | |
| 6,434,143 B1* | 8/2002 | Donovan | 370/356 |
| 6,553,422 B1 | 4/2003 | Nelson | |
| 6,567,915 B1 | 5/2003 | Guthery | |
| 6,584,567 B1 | 6/2003 | Bellwood et al. | |
| 6,601,099 B1* | 7/2003 | Corneliussen | 709/224 |
| 6,865,681 B2* | 3/2005 | Nuutinen | 726/14 |
| 6,963,635 B1* | 11/2005 | Jones | 379/114.14 |
| 7,010,727 B1* | 3/2006 | Stucker | 714/52 |
| 7,142,537 B2* | 11/2006 | Shores et al. | 370/389 |
| 7,243,370 B2* | 7/2007 | Bobde et al. | 726/10 |
| 7,382,881 B2* | 6/2008 | Uusitalo et al. | 380/262 |
| 7,412,521 B2* | 8/2008 | Olson et al. | 709/227 |
| 7,421,732 B2* | 9/2008 | Costa-Requena et al. | 726/3 |
| 2002/0129236 A1* | 9/2002 | Nuutinen | 713/151 |
| 2002/0141404 A1* | 10/2002 | Wengrovitz | 370/389 |
| 2002/0174125 A1 | 11/2002 | Lucovsky et al. | |
| 2002/0178240 A1 | 11/2002 | Fiveash et al. | |
| 2002/0184521 A1 | 12/2002 | Lucovsky et al. | |

(Continued)

FOREIGN PATENT DOCUMENTS

EP   1 267 548 A   12/2002

(Continued)

OTHER PUBLICATIONS

Denial of service attacks targeting a SIP VoIP infrastructure: attack scenarios and prevention mechanisms; Sisalem, D.; Kuthan, J.; Ehlert, S.; Network, IEEE; vol. 20, Issue 5, Sep.-Oct. 2006 pp. 26-31.*

(Continued)

*Primary Examiner*—Edan Orgad
*Assistant Examiner*—Salman Ahmed
(74) *Attorney, Agent, or Firm*—Merchant & Gould P.C.

(57) ABSTRACT

A method, computer readable medium having computer executable instructions, and a computer readable medium having stored thereon a data structure for signing and validating Session Initiation Protocol ("SIP") routing headers are disclosed. A SIP node may receive a SIP request including a message header. A signature based upon at least a portion of the message header and a SIP node header entry may be generated. The signature may then be inserted into the SIP node header entry.

12 Claims, 13 Drawing Sheets

U.S. PATENT DOCUMENTS

| | | | |
|---|---|---|---|
| 2003/0005280 A1* | 1/2003 | Bobde et al. | 713/150 |
| 2003/0009570 A1 | 1/2003 | Moskowitz et al. | |
| 2003/0084331 A1 | 5/2003 | Dixon et al. | |
| 2003/0105962 A1* | 6/2003 | Le et al. | 713/170 |
| 2003/0105965 A1 | 6/2003 | Challenger | |
| 2003/0110257 A1 | 6/2003 | Hyun et al. | |
| 2003/0217165 A1* | 11/2003 | Buch et al. | 709/229 |
| 2004/0043756 A1* | 3/2004 | Haukka et al. | 455/411 |
| 2004/0088424 A1 | 5/2004 | Park et al. | |
| 2004/0128554 A1* | 7/2004 | Maher et al. | 713/201 |
| 2004/0205192 A1* | 10/2004 | Olson et al. | 709/227 |
| 2004/0225878 A1* | 11/2004 | Costa-Requena et al. | 713/150 |
| 2004/0246991 A1* | 12/2004 | Tsuzuki et al. | 370/466 |
| 2004/0258239 A1* | 12/2004 | Gallant et al. | 379/900 |
| 2005/0286542 A1* | 12/2005 | Shores et al. | 370/401 |
| 2006/0031536 A1 | 2/2006 | Eydelman et al. | |
| 2006/0146766 A1* | 7/2006 | Nakajima et al. | 370/338 |
| 2007/0291743 A1* | 12/2007 | Froment et al. | 370/352 |
| 2008/0022383 A1* | 1/2008 | Bobde et al. | 726/10 |
| 2008/0270618 A1* | 10/2008 | Rosenberg | 709/228 |

FOREIGN PATENT DOCUMENTS

EP        1583318 A2 * 10/2005

OTHER PUBLICATIONS

SIP security problems in NGM Services; Leitold, F.; Medve, A.; Kovacs, L.; Next Generation Mobile Applications, Services and Technologies, 2007. NGMAST '07. The 2007 International Conference on Sep. 12-14, 2007 pp. 241-246.*

SIP end-to-end security between Ipv4 domain and Ipv6 domain; Xing Jiang; Atwood, J.W.; SoutheastCon, 2005. Proceedings. IEEE; Apr. 8-10, 2005 pp. 501-506.*

SIP security issues: the SIP authentication procedure and its processing load; Salsano, S.; Veltri, L.; Papalilo, D.; Network, IEEE; vol. 16, Issue 6, Nov.-Dec. 2002 pp. 38-44; Digital Object Identifier 10.1109/MNET.2002.1081764.*

Extending SIP authentication to exploit user credentials stored in existing authentication databases; Salsano, Stefano; Polidoro, Andrea; Veltri, Luca; Software, Telecommunications and Computer Networks, 2008. SoftCOM 2008. 16th International Conference on Sep. 25-27, 2008 pp. 375-379.*

Mobile Intelligent Network security with SIP Authentication Procedure; Abdallah, H.; Daniel, B.; Information and Communication Technologies: From Theory to Applications, 2008. ICTTA 2008. 3rd International Conference on Apr. 7-11, 2008 pp. 1-6.*

Deng et al., Defending Against Redirect Attacks in Mobile IP, 9th Conference on Computer and Communications Security, Nov. 18-22, 2002, pp. 59-67, Washington DC.

Gordon et al., Validating a Web Service Security Abstraction by Typing, Proceedings of the 2002 ACM Workshop on XMP-Security, Nov. 2002; pp. 18-29, ACM Press, Fairfax; VA.

Jennings et al., RFC3325 Private Extensions to the SIP for Asserted Identity within Trusted Networks, (http://www.faqs.org/rfcs/rfc3325.html), Nov. 2002, The Internet Society.

Marshall ed., RFC3313 Private Session Initiation Protocol (SIP) Extensions for Media Authorization, (http://www.faqs.org/rfcs/rfc3313.html), Jan. 2003, The Internet Society.

Rosenberg et al, RFC3261 SIP: Session Initiation Protocol, (http://www.faqs.org/rfcs/rfc3261.html), Jun. 2002, The Internet Society.

SIP: Protocol Overview, (http://www1.radvision.com/NR/rdonlyres/0F6C2E81-72B3-4C42-B33C-DDBC9115AC3D/234/SIP-ProtocolOverview.pdf), 2001, pp. 1-16, Radvision Ltd.

EP 05102470, European Patent Office, "Partial European Search Report", Berlin, Date of Search Jul. 27, 2005.

European Patent Office, "European Search Report", for European Patent Application No. 05103723.2, Aug. 17, 2005, The Hague.

J. Rosenberg et al., "SIP: Session Initiation Protocol", Internet Engineering Task Force, Jun. 2002, pp. 1-269.

European Patent Office, "European Search Report", for European Patent Application No. 05 10 2470.01, Nov. 24, 2005.

* cited by examiner

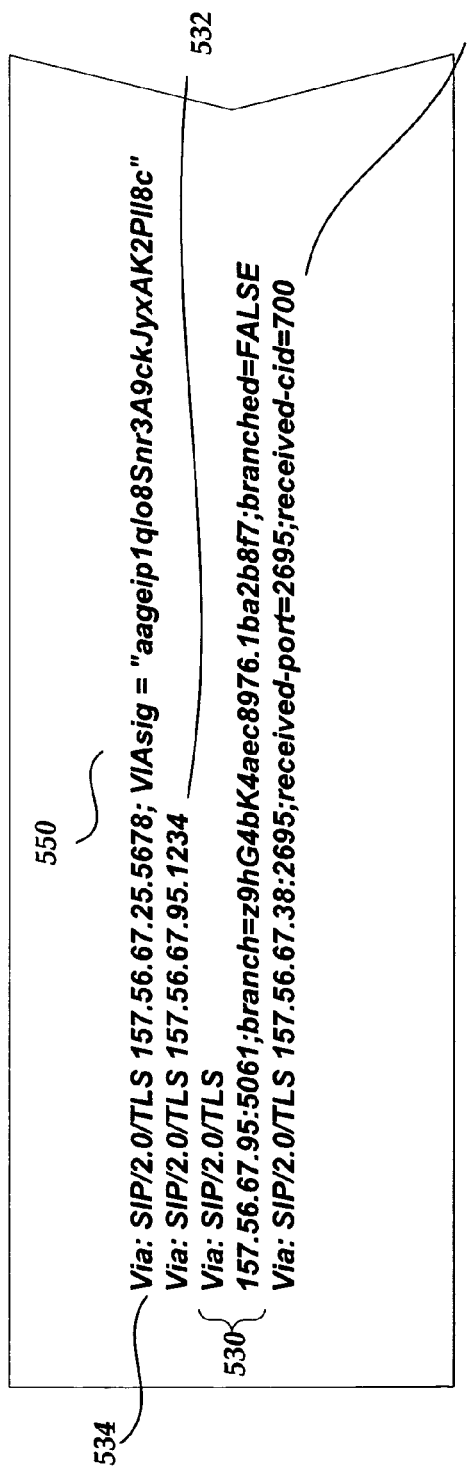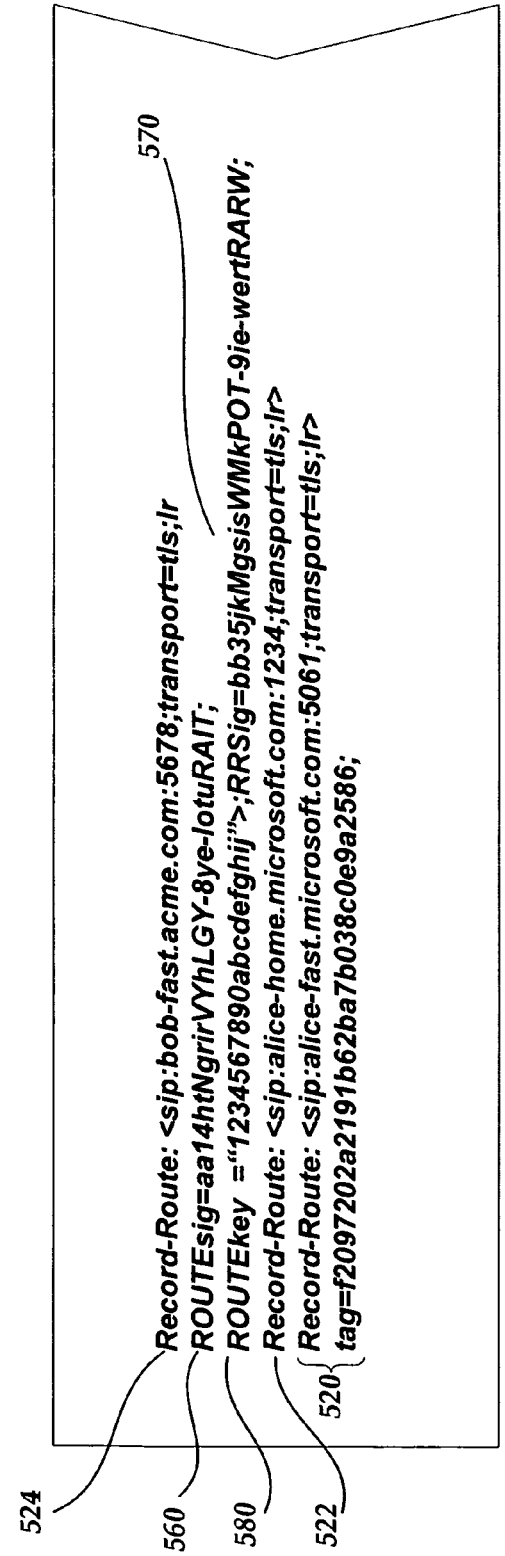
Fig. 3
Fig. 4

```
SIP/2.0 200 OK
Via:SIP/2.0/TLS 157.56.67.25.5678; VIAsig = "aageip1qlo8Snr3A9ckJyxAK2PIl8c";
Via:SIP/2.0/TLS 157.56.67.95.1234
Via: SIP/2.0/TLS   157.56.67.95:5061;branch=z9hG4bK4aec8976.1ba2b8f7;branched=FALSE
Via: SIP/2.0/TLS 157.56.67.38:2695;received-port=2695;received-cid=700
From: "alice" <sip:alice@microsoft.com>;epid=d95f37aa54;tag=fadf291391a0495ab7aaac8d23c9d7eb
To: <sip:bob@racme.com>;epid=d7bfb984ca9aabc8c0c316c0eaf;epid=7032e16a24
Call-ID: 374142e532824c93895353ec9a007f0e@157.56.67.38
CSeq: 1 INVITE
Record-Route: <sip:bob-fast.acme.com:5678;transport=tls;lr; ROUTEsig=aa14htNgrirVYhLGY-8ye-
lotuRAIT;ROUTEkey = "1234567890abcdefghij">;RRSig=bb35jkMgsisWMkPOT-9ie-wertRARW
Record-Route: <sip:alice-home.microsoft.com:1234;transport=tls;lr>
Record-Route: <sip:alice-fast.microsoft.com:5061;transport=tls;lr>
tag=f2097202a2191b62ba7b038c0e9a2586;
Contact: <sip:bob@racme.com:2688;maddr=157.56.67.38;transport=tls>;proxy=replace
...
v=0
o=- 0 0 IN IP4 157.56.67.39
s=session
...
```

*Fig. 5*

SIGNING AND VALIDATING SESSION INITIATION PROTOCOL ROUTING HEADERS

FIELD OF THE INVENTION

This application is directed to methods and computer readable mediums for communicating between devices over a computer network, and more particularly, to methods and computer readable mediums for signing and validating Session Initiation Protocol ("SIP") routing headers to authenticate routing commands contained in an SIP message.

BACKGROUND OF THE INVENTION

The Session Initiation Protocol ("SIP") is an Internet signaling protocol for establishing, managing, and terminating communication sessions, including instant messaging, Internet telephone calls, and Internet video conferencing. SIP is specified in Internet Engineering Task Force Request for Comments 2543 and Request for Comments 3261, which are each incorporated herein by reference. SIP sessions involve one or more participants or clients (typically a caller and a callee). The SIP messages are routed between each end-point SIP node (e.g., the caller and callee) through a network of SIP nodes, typically various servers.

There are generally two types of SIP messages: requests which are sent from the caller (e.g., endpoint SIP node) to the callee, and responses which are sent from the callee to the caller in reply to the request. In some cases, a callee may also send a request to the caller after the dialog session is initiated. Each SIP message, whether a response or a request, generally includes three parts: a start line, headers, and a body. The start line conveys the message type (e.g., request or response) and the protocol version, and the message body includes the content of the message and may convey session description information beyond the signaling information in the start line. The SIP header fields convey attributes of the message and modify the message meaning. Some attributes of the message stored in the header fields are instructions on how to route the message as well as document the actual route traveled by the message. For example, each SIP node which manages a request on its route will add a 'VIA' header containing information identifying that SIP node, such as a fully qualified domain name or Internet Protocol address. In this manner, loops in the routes may be detected and the response uses the VIA headers from the request to determine the route to be traveled to return to the caller. However, the particular path of a message may not be fixed over time, thus, the SIP node, such as a home server, may receive a first request of a dialog, such as a telephone call, but may not receive subsequent requests in the same dialog. To remain 'in the loop' for that dialog, the SIP node may insert a RECORD-ROUTE header containing information identifying itself, such as a uniform resource indicator ("URI") or other address that allows other servers or endpoints to reach the SIP node. Portions of the completed list of RECORD-ROUTE headers are then copied by the receiving end client (callee for requests and caller for responses) into a set of ROUTE headers. The ROUTE SET headers contain data providing instructions to SIP nodes on how to route any future requests within the same dialog session.

SUMMARY OF THE INVENTION

Although the SIP header fields discussed above assist in routing messages to and from SIP nodes, such as servers along the route of the message, many of these headers are not secure when used in accordance with the SIP standards (RFC3261). For example, denial of service attacks may be directed at a server with multiple forged SIP messages including counterfeit routing information in the SIP header. The true originator of the counterfeit message may be masked by the forged header information, possibly making it appear that the denial of service attack is originating at an innocent server. In addition, forged routing headers may create looping messages between two servers. In this manner, each server along the forged 'route' of the counterfeit message may waste valuable resources to process and forward the counterfeit messages, thus denying those resources to legitimate users.

Embodiments of the invention are directed toward methods and computer readable mediums for authenticating routing headers found in an SIP message. Specifically, a SIP node may receive a SIP request which includes a message header. A signature may be generated based upon at least a portion of the message header and inserted into a SIP node header entry. As used herein, a SIP node means a SIP application running on a computing device which may operate as a SIP client or a server.

For example, a first signature may be generated based upon at least a portion of the VIA headers in the received request header and inserted into the VIA header for the SIP node. When the response to the SIP request is generated, the VIA header of the SIP node is echoed back in the response header according to SIP standard processing. When the SIP node receives the response, the SIP node may verify the first signature in the SIP node VIA header of the response to authenticate the integrity of the actual path traveled by the response.

Additionally or alternatively, a second signature may be generated based upon at least a portion of the RECORD-ROUTE headers and the CONTACT header of the message header. The second signature may be inserted into the RECORD-ROUTE header of the SIP node. Portions of this RECORD-ROUTE header with the appended second signature may then be saved by the callee system for use as a ROUTE header for routing and verifying requests generated by the callee system to the caller system after the session has been initiated.

Additionally or alternatively, a third signature may be generated based upon at least a portion of the RECORD-ROUTE headers of the message header. The third signature may be inserted into the RECORD-ROUTE header of the SIP node. When the callee responds to the SIP request, the RECORD-ROUTE header of the SIP node is echoed back in the response header. To verify the integrity of the instructions on how to route future requests, the third signature may be verified by the SIP node when the SIP node receives the response. For example, the SIP node receiving the response may identify the RECORD-ROUTE header containing data echoed from the request header and extract the signature from the echoed header. The SIP node may generate a verification signature using the same process used to generate the third signature, e.g., generating a signature based upon at least a portion of the headers in the response header. The SIP node may then compare the verification signature with the extracted signature. If the signatures match, then the message may be processed normally.

A fourth signature may be generated and inserted into a SIP response header. For example, the SIP node receiving a response may generate a fourth signature based upon at least a portion of the RECORD-ROUTE headers of the response header and the CONTACT header of the response header. The fourth signature is similar to the second signature discussed above, however, since the fourth signature is generated based upon the CONTACT header in the response, the CONTACT identifies the callee rather than the caller as with the request. The fourth signature may then be inserted into the RECORD-ROUTE header for the SIP node. The caller system, when it receives the response, may then save portions of the RECORD-ROUTE header with appended signature as a ROUTE SET header for use and verification of routing instructions in subsequent requests.

In some cases, a SIP node processing SIP messages may be provided by a pool of servers having at least a first server and a second server which can be interchangeably used to process messages in the same dialog. However, as messages are exchanged, a request in a dialog may contain a signature generated by the first server but may be sent to the second server for processing. This requires the second server to have the session key that will be used to verify the signature in the request. To securely transfer the session key used to generate the signature in the request, the first server generating the signature may append an encrypted and signed session key to a header of the message. For example, the session key may be inserted into the same header which includes the signature generated by that key. To protect the session key from other SIP nodes, the first server may encrypt the session key with a public key accessible to the pool of servers. The first server may then sign the encrypted key with a private key accessible to the pool of servers. The second server receiving the request may verify the signature on the encrypted key and then decrypt the session key. Using the decrypted session key, the second server may then verify the signature based upon at least a portion of the message header. It is to be appreciated that any suitable security process may be used to protect the session key, including for example, asymmetric key technologies including public/private key pairs.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is an example set of VIA headers in accordance with FIG. 1;

FIG. 4 is an example set of RECORD-ROUTE headers in accordance with FIG. 1;

FIG. 5 is an example response to the INVITE request of FIG. 2;

DETAILED DESCRIPTION OF THE PREFERRED EMBODIMENT

Denial of service attacks are typically computerized assaults launched by attackers to overload or halt network services, such as Web servers or file servers. For example, an attack may cause the server to become so busy attempting to respond to counterfeit messages that it ignores legitimate requests for connections. Alternatively, the routing of legitimate messages may be corrupted and cause SIP nodes to forward responses incorrectly. In some cases, the communication protocol used to transmit the messages across a computer network may be a significant point of attack. For example, as noted above, counterfeit SIP messages may be sent with forged VIA headers, ROUTE headers, and/or RECORD-ROUTE headers, thus directing messages to victim SIP nodes and/or masking the identity and source of the attacker. To reduce these denial of service attacks, the routing instructions and actual routing path contained in the SIP headers may be validated to ensure their integrity.

Figure 1:
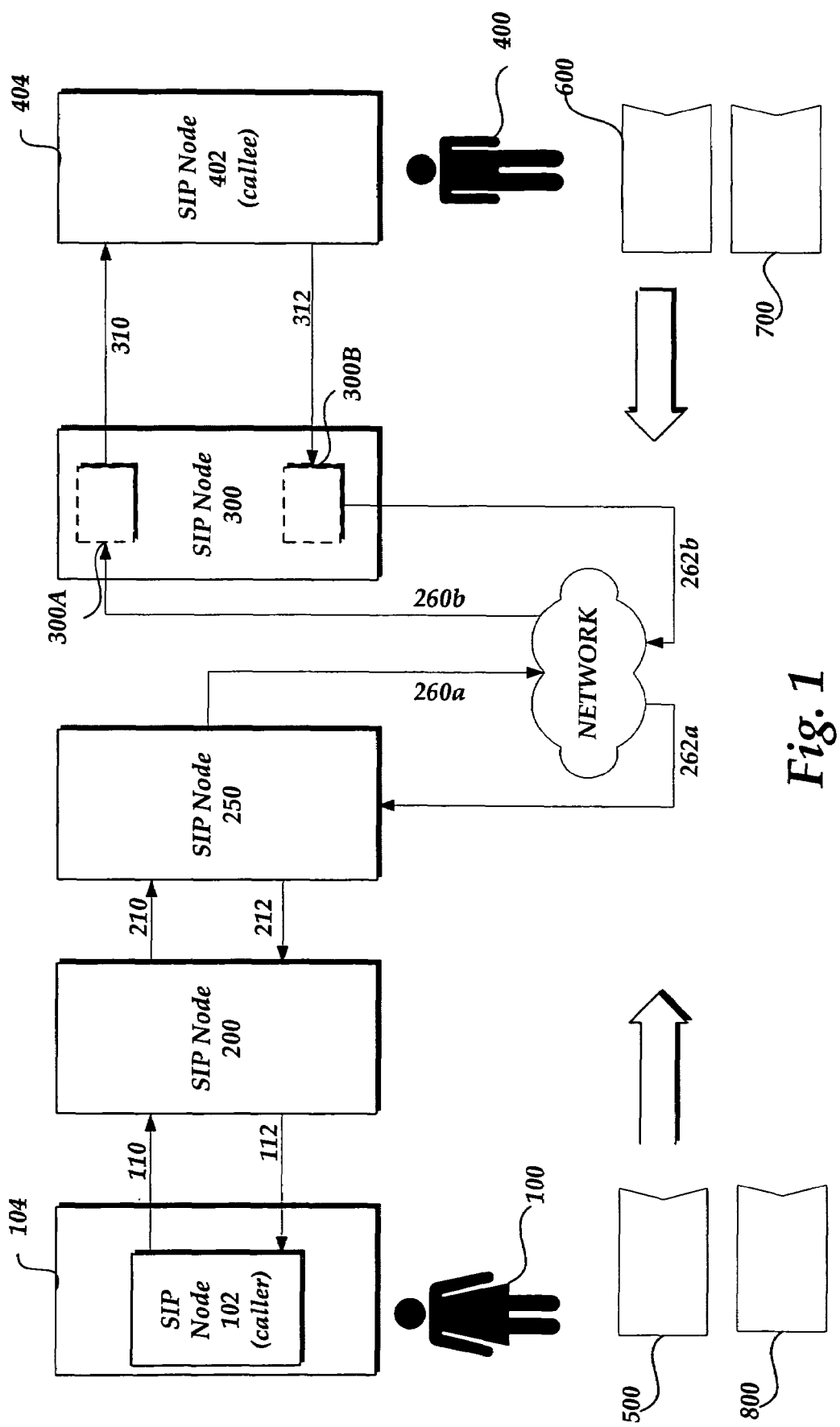
FIG. 1 is a schematic diagram of an INVITE request and response route between two Session Initiation Protocol ("SIP") clients in accordance with one embodiment of the invention.

FIG. 1 illustrates an example session initiation operation in which a user 100 (e.g., Alice) of a SIP client 102 wants to initiate a communication session with another user 400 (Bob) over a communication network which may include the Internet, an intranet, a wide-area network, a local area network, virtual private network, and the like. To that end, the SIP client 102 residing on computer system 104 sends an INVITE request message 500 that identifies Bob as the intended recipient. In the context of communications under the SIP standard, the SIP client 102 that sends the INVITE message 500 to initiate a session is referred to as the "caller," and the SIP client 402 on Bob's computer system 404 is referred to as a "callee." As defined in SIP, the SIP client 102 is also called a "user agent client" ("UAC") as it creates a new request, and the SIP client 402 is also called a "user agent server" ("UAS") as it generates a response 600 to the SIP request 500.

As shown in FIG. 1, the INVITE message 500 from Alice is sent to an outbound server 200 for the caller SIP client's domain. Thereafter, the INVITE message may be passed through multiple SIP nodes involved in the signaling operation before it reaches the SIP proxy server 300 of Bob's domain. For the sake of simplicity, only five SIP nodes are illustrated in FIG. 1, however, it should be appreciated that any of the links may include other servers, gateways, bridges, and the like. The SIP proxy 300 forwards the INVITE message to the SIP client 402 (the callee) of Bob's computer. Bob's computer may automatically, or upon authorization from Bob, send a response 600 to the INVITE, such as a "200 (OK)" message indicating a successful transmission.

Figure 2:
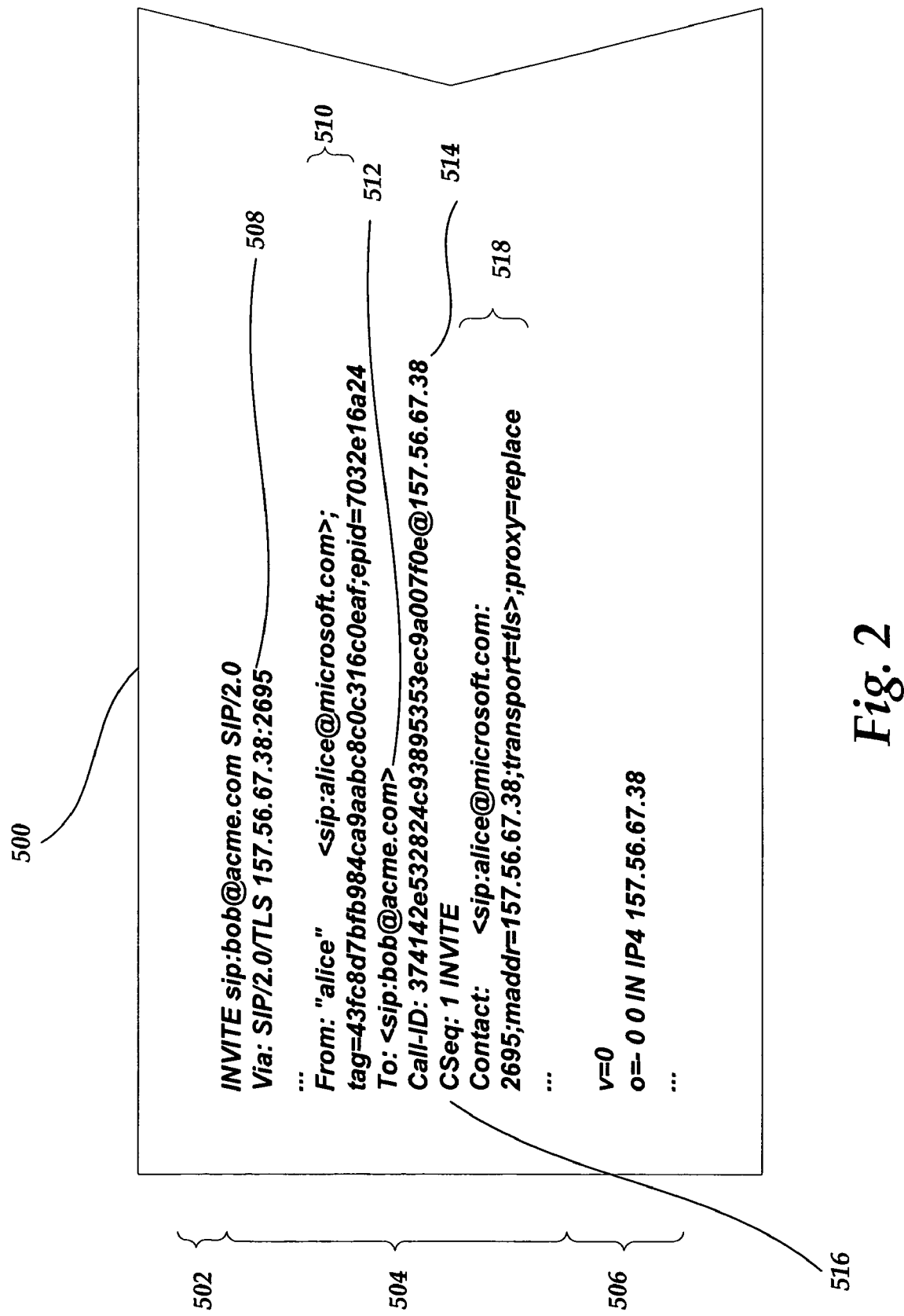
FIG. 2 is an example INVITE request in accordance with FIG. 1.

As noted above, each SIP message generally includes a start line, a header containing information regarding the attributes and routing of the message, and a body of the message. For example, FIG. 2 illustrates a representation of an INVITE request 500 as sent by Alice's SIP client 102 and received by the SIP node 200. The example INVITE 500 includes a start line 502, a plurality of headers 504 and a body 506. The start line 502 identifies the message type (here INVITE), the requesting URI which is generally the SIP address of the callee, and the SIP version. The headers 504 are accepted fields under the SIP standard. The VIA header 508 contains information indicative of the protocol and the address of a previous hop. The FROM header 510 contains information indicative of the user originating the request (caller), here Alice. The TO header 512 contains information indicative of the callee, as specified by the caller. The Call-ID header 514 contains information indicative of a globally unique identifier of the session being initiated. The CSeq header 516 contains information indicative of an identifier which distinguishes multiple message sent with identical FROM, TO and Call-ID headers as part of the same transaction. The CONTACT header 518 contains information indicative of the destination for subsequent requests, allowing the routing of future messages to bypass SIP nodes not listed in the RECORD-ROUTE headers (discussed further below). The VIA header, the TO header, the FROM header, the CONTACT header, the RECORD-ROUTE header, and the ROUTE header each contain data indicative of routing locations in the network such as a URI, Internet protocol address and the like. For example, a RECORD-ROUTE header containing data indicative of routing locations may include a URI portion enclosed in "< >" brackets followed by header parameters. The URI portion within the "< >" brackets may include a URI and URI parameter. Generally, at least one blank line marks the end of the headers 504 and the beginning of the body portion 506. The example response 600 shown in FIG. 5, like the INVITE request, includes a start line 602, a header portion 604, and a body 606.

Under the SIP standard, every SIP node which manages the INVITE 500 as it travels across the network adds a VIA header to the INVITE header 504. In this manner, the accumulated VIA headers may be used by the callee to direct routing of the response in reply to the request back to the caller. If the SIP node would like to continue to manage messages for that particular dialog between the caller and the callee, the SIP node may insert a RECORD-ROUTE header into the INVITE header 504. In this manner, to direct routing of future requests which may be generated by the callee, the accumulated URI portions of the RECORD-ROUTE headers and CONTACT header for a dialog-initiating request may be saved by the receiving callee as a ROUTE SET of headers in the same order as listed. Similarly, to provide routing instructions for future requests generated by the caller, the accumulated URI portions of the RECORD-ROUTE headers and CONTACT header in a response to a dialog-initiating request may be saved by the caller in reverse order as ROUTE SET headers.

FIG. 1 illustrates a specific example of routing an INVITE request and response in view of the addition of headers by processing SIP nodes. For the sake of simplicity, extraneous headers and other message information have not been included. It is to be appreciated that the functions and number of the SIP nodes illustrated are exemplary and that the message routing and verification may be modified for particular purposes and/or network architectures.

As shown in FIG. 1, the SIP node 200 may be a home server and may receive the INVITE request from the SIP client 102. The SIP node 200 receiving the message inserts a VIA header into the header 504 of the INVITE request. SIP node 200, as a home server, may want to manage any SIP messages to and from the SIP client 102. Accordingly, SIP node 200 may insert a RECORD-ROUTE header into the INVITE message before it forwards the message to the next SIP node. In the illustrated embodiment of FIG. 1, the next SIP node 250 is an edge server for the caller SIP client 102. The SIP node 250 forwards the INVITE message after inserting its own VIA header and RECORD-ROUTE header into the header 504 of the message. Eventually, the INVITE message is routed to SIP node 300, which in the illustrated embodiment of FIG. 1, is an edge proxy server of the callee SIP client 402. An edge proxy server may be a proxy server which is designed to run at the edge of the network, e.g., separating a local network from the Internet. Like the edge server 250, the edge proxy server 300, inserts a VIA header and a RECORD-ROUTE header into the INVITE header 504 before forwarding the message to the SIP client 402. Examples of the VIA header 530 of the SIP node 200, the VIA header 532 of the SIP node 250, and the VIA header 534 of the SIP node 300 inserted into the INVITE request 500 are illustrated in FIG. 3. Examples of the RECORD-ROUTE header 520 of the SIP node 200, the RECORD-ROUTE header 522 of the SIP node 250, and the RECORD-ROUTE header 524 of the SIP node 300 inserted into the INVITE message 500 are illustrated in FIG. 4.

Bob's SIP node 402 may accept the INVITE and may send an OK response 600 in reply to the INVITE request. FIG. 5 illustrates an example response 600 from SIP node 402 to server 300. Under the SIP standard, many of the header fields, or at least portions of the header fields, of the response 600 are copied or echoed from the received request. These echoed headers may include, for example as determined under the SIP standard, each VIA header, a FROM header, a TO header, each RECORD-ROUTE header, a Call-ID header, and a CSeq header. In this manner, the response 600, shown in FIG. 5, illustrates the echoed headers. Specifically, the VIA headers 608, 630, 632, 634 in the response 600 are identical to the VIA headers 508, 530, 532, 534 in the INVITE 500 as received by the callee SIP node 402. Similarly, the RECORD-ROUTE headers 620, 622, 624 are identical to the RECORD-ROUTE headers 520, 522, 524 generated by the SIP nodes and as received by the callee SIP node 402. The response message is then routed through the network as directed by the VIA headers 608, 630, 632, 634 to the caller SIP node 102.

The SIP nodes, e.g., SIP nodes 300, 250, 200, processing the response may validate the integrity of the actual route taken by the response by validating the routing instructions contained in the VIA headers. In one embodiment, the SIP node may store the routing information such as the VIA headers 508, 530, 532, in a database for later access and use to verify the response VIA headers 608, 630, 632. Alternatively, to reduce memory and access loads on the SIP node, the SIP node may generate a signature based upon at least a portion of at least one header which contains data indicative of a network routing location in the route of the message. For example, the signature may be based upon all of the header containing the network routing location, or may be based upon only a portion of that header, such as the URI, the URI parameter, the peer fully qualified domain name ("FQDN") and the like. The signature may be based upon other information in addition to the at least one header, including a connection identifier of the connection over which the message will be sent on the next hop, an echoed header, a TO header, a FROM header, a CONTACT header, a CALL-ID header, a CSeq header, and a Branch-ID. The signature based upon the at least a portion of at least one header of the request may then be transferred to the response and validated when the response is processed by the SIP node. Whether a header portion should be included in the signature or not may depend on whether the header portion will change before it is verified by the SIP proxy. For example, the header portions containing information which may be removed or changed before they are accessed for verification of the signature should not be included in the signature. It is to be appreciated that any or all of the SIP nodes in the route of the SIP message may generate and store a verification signature in any suitable manner, including that discussed herein. It is also to be appreciated that the headers of the SIP message may be validated as appropriate in accordance with the security concerns and standards of the network and SIP nodes, including maintaining a list of trusted links, complying with a global policy on signing, and signing/validating messages to/from a particular domain. For example, to implement a list of trusted links, each server may maintain a list of links that it considers trusted. Thus, any message going to/coming from a trusted link may not be signed/validated. Consequently, the server may check the list of trusted links before generating/validating a signature to ensure that the link is untrusted, e.g., not listed in the trusted links list.

In one example, a signature may be generated based upon at least one VIA header of the request message using an accessible session key. To validate the route traveled by the message, the SIP node may generate a VIA signature based on all the VIA headers or at least all the VIA headers received by the SIP node. For example, for the INVITE message 500 shown in FIGS. 1 and 2, SIP node 200 may provide a VIA signature based upon the VIA header 508 containing information designating the SIP client 102 (Alice) by using a session key accessible by the SIP node 200. The generated VIA signature may be stored within the message, transferred to the response message and then validated on the return trip of the message through SIP node 200. Similarly, the SIP node 300 may generate a VIA signature based upon the received VIA headers to later validate the response when it is received at SIP node 300. To sign the VIA headers, SIP node 300 may generate a VIA signature based upon the VIA header 508 of Alice, the VIA header 530 of SIP node 200, and the VIA header 532 of SIP node 250 using an accessible session key.

It is to be appreciated that any suitable combination of VIA headers and other header information may be signed to authenticate the routing instructions in the response header 604. For example, the VIA signature may be based upon a portion of the VIA headers in addition to portions of the TO header, the FROM header, or any other header which may be echoed from the request header 504 to the response header 604. Moreover, the VIA signature 550 inserted into the request header 504 may be any data or signal indicative of the generated digital signature. For example, the stored signature 550 may be a predetermined number of significant bits of a generated signature blob or may be the entire digital signature.

To ensure that the VIA signature generated during processing of the INVITE request is present for verification in the response at the SIP node, the generated VIA signature may be inserted into an echoed header of the INVITE request. For example, the signature may be inserted as a URI parameter or a header parameter after the standard routing location information. Thus, as the client SIP node 402 generates the response headers 604 based upon the echoed headers of the SIP request, the generated signatures are automatically transferred from the request to the response. Consequently, the SIP node receiving the response may validate the signature transferred to the response header. It is to be appreciated that any echoed header or custom header which is echoed by a client SIP node based on prior agreement may be suitable for storing the signature for validation by a SIP node.

As shown in FIG. 3, the VIA signature may be inserted into the VIA header of the SIP node generating the signature. For example, SIP node 300 may generate a VIA signature 550 based upon the VIA headers 508, 530, 532 received in the request 500. The SIP node 300 may insert the VIA signature 550 into the VIA header 534 of SIP node 300. As noted above, the VIA headers in a request header are echoed back in the response headers 604. Thus, when SIP node 402 forms the response 600, it may copy the information contained within VIA header 534 into VIA header 634 of the SIP node 300 (FIG. 1). Under standard SIP processing, as the VIA header is echoed, the standard VIA information is copied as well as any information appended as a header parameter, such as the VIA signature 550.

To validate the received VIA signature 650, the SIP node 300 (FIG. 1) may strip and save the received VIA signature 650 shown in FIG. 5. The SIP node 300 may generate a validation VIA signature using the same procedures used to generate the VIA signature 550 inserted into the request. In accordance with the generation of the VIA signature 550 discussed above, the SIP node 300 may identify the VIA headers in the received response 600 and generate the validation VIA signature based upon all VIA headers listed below the VIA header 534 of SIP node 300. In this manner, the validation VIA signature may be based upon those VIA headers which were known by SIP node 300 when it generated the VIA signature 550 in the request message 500. Consequently, the validation VIA signature for SIP node 300 may be based upon VIA header 632 for SIP node 250, VIA header 630 for SIP node 200 and VIA header 608 for the caller SIP node 102. The SIP node 300 may compare the validation VIA signature with the received VIA signature 650.

If the signatures do match, SIP node 300 may continue normal processing under the SIP standard and forward the response to the next SIP node indicated in the VIA headers of the response headers 604. If the signatures do not match, SIP node 300 may drop the response 600 from its processing stack and/or send an error message to a SIP node monitoring service (not shown) or any appropriate monitoring agent if supported by the protocol. To measure message processing performance for signature compliance and/or detection of attacks, SIP node 300 may increment a signature failure performance counter for each rejected message. The signature failure performance counter may be any data or signal indicative of the failures of the SIP node to verify header signatures. For example, the signature failure performance counter may count the number of failed signature validations within a period of time. The signature failure performance counter may then be compared to a predetermined threshold value of failed signature validations for that period of time, such as approximately 6 failed signature validations, approximately 10 failed signature validations, or approximately 25 failed signature validations in approximately 1 second of message processing time. When the performance counter exceeds the threshold, the SIP node may notify or alert a human system administrator (including through an email and/or page), and/or to a computer-based system administrator which may initiate predetermined actions based on the performance counter, including for example, dropping the network connection routing the failed messages, locking the network, and/or flushing the message queues.

In some cases, the signature may be generated and/or validated at each step on the route, e.g., at each SIP node processing the request and/or the response on the return trip. However, to reduce the computational burden on SIP node servers, the message may be validated only when it is required.

For example, if a request contains only one VIA header, e.g., VIA header 508 of Alice's SIP node 102 in the request 500, no signature may be generated in the request at the node. More particularly, Alice's SIP node 102 may not need to verify any routing instructions in the response 600 since the response will be consumed by SIP node 102, e.g., it will not be forwarded further. Thus, no VIA signature may be generated when the request contains only one VIA header, and correspondingly, no VIA signature may need to be verified when the received request contains only 1 VIA header, e.g., the VIA header of the receiving SIP node.

In an additional example, denial of service attacks may be more likely if the message is received over an untrusted connection. To improve the security of the message, the message may be validated when it is received over an untrusted connection. For example, an untrusted connection may include any client connection for any server type since messages received from other servers may be authenticated with other methods. An untrusted connection may also include an external server connection for an edge proxy server, and more particularly, may include all external server connections.

As shown in FIG. 1, the connections 210, 212 between SIP node 200 and SIP node 250 may be trusted connections since those connections may be considered internal links between a home server and an edge server. Since servers may have other methods of authenticating message traffic between servers, the links 260, 262 between SIP node 250 and SIP node 300 may be trusted connections; however, these links may be considered untrusted in some cases, particularly if other methods of server authentication are not considered sufficient. The links 310, 312 between the client node 402 and the SIP node 300 may be untrusted connections since the SIP messages are sent to/from a client SIP node. Consequently, any message traffic received over an untrusted connection, such as link 312 may be validated at the SIP node to verify the message integrity and/or authenticity.

If responses received over trusted links will not be validated, then a VIA signature does not need to be generated when the request will be forwarded to the next SIP node over a trusted link. For example, SIP nodes 200 and 250 may not receive the response 600 over an untrusted connection, and therefore, these nodes may not generate or store a VIA signature within the headers 504 of the INVITE request since they may have no requirement to validate the route of the response. Consequently, before generating a VIA signature, the SIP node may determine if validation of the corresponding response is required. If the response does not need to be verified, e.g., the next link is a trusted connection, then no VIA signature needs to be generated and normal processing of the SIP request may continue. However, if the corresponding response would be received at the SIP node over an untrusted connection, then the VIA signature may be generated as discussed above. Similarly, after receiving a response, a SIP node may first determine if the response is received from an untrusted connection. If so, then the VIA signature may be validated, if present. For example, SIP node 300 may determine if the response 600 is received over an untrusted connection. As shown in FIG. 1, link 312 is an untrusted connection. As a result, SIP node 300 may then identify the VIA header 634 of the SIP node 300 within the header 604 of the response. The SIP node 300 may determine if a signature is present within the identified VIA header 634. If no VIA signature is present, SIP node 300 may send an error message if allowed by the protocol, may drop the message from its processing stack, may increment a signature failure performance counter and/or take any other appropriate action. If a VIA signature 650 is present, as shown in FIG. 5, SIP node 300 may verify that signature as discussed above.

Signing VIA headers, as noted above, may assist in validation of the integrity of the routing instructions in the response header 604. However, an SIP node may additionally or alternatively desire validation of the routing instructions for a request generated by a callee. Accordingly, an SIP node may generate a signature based upon at least a portion of at least one of the RECORD-ROUTE headers of a dialog-initiating request and then validate that signature in a subsequent request from the callee to ensure the integrity of the routing instructions of the in-dialog request.

To ensure the integrity of the route to be traveled by the callee request, the SIP node may generate a callee ROUTE SET signature based upon the URI portions of the RECORD-ROUTE headers and the CONTACT header contained in the received header fields of the request. If more than one CONTACT header is present, the callee ROUTE SET signature may be based upon the selected URI portions of the RECORD-ROUTE headers and the URI portion of the first listed CONTACT header. More particularly, for the INVITE message 500 shown in FIGS. 1, 2, and 4, SIP node 300 may provide a callee ROUTE SET signature based upon the URI portion of the RECORD-ROUTE header 522 of SIP node 250, the URI portion of the RECORD-ROUTE header 520 of SIP node 200, and the URI portion of the CONTACT header 518 of the caller Alice. The generated callee ROUTE SET signature may be stored within the message and transferred to the callee SIP node 402 for storage and use within any requests generated by the callee SIP node 402 that belong to the same dialog. It is to be appreciated that any suitable combination of RECORD-ROUTE headers and other header information may be signed to authenticate the routing instructions for any subsequent request generated by the callee SIP node 402. The callee ROUTE SET signature inserted into the request header 504 may be any data or signal indicative of the generated signature including a predetermined number of significant bits of the signature blob and the entire digital signature.

To ensure that the callee ROUTE SET signature generated during processing of the request is present for verification in subsequent requests generated by the caller SIP node 402, the generated callee ROUTE SET signature may be inserted into an echoed header of the request. Thus, as the client SIP node 402 generates a new request based upon the echoed headers of the SIP dialog-initiating request, the generated signatures are automatically transferred. Consequently, the SIP node receiving the request may validate the signature transferred to the request header. It is to be appreciated that any echoed header portion or custom header which may be echoed back by a client SIP node based on prior agreement may be suitable for storing the callee ROUTE SET signature for validation by a SIP node.

Figure 6:
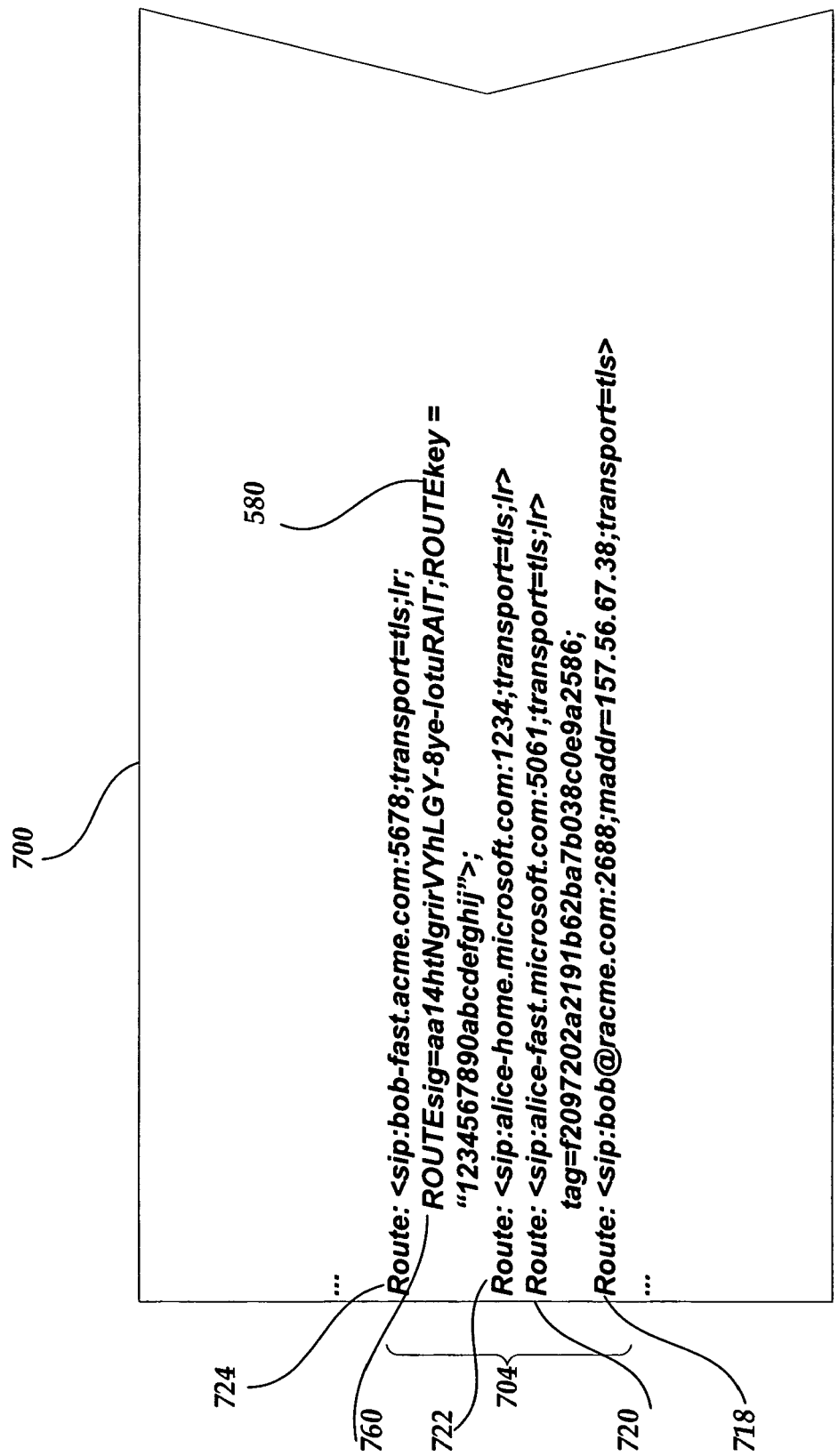
FIG. 6 is an example request generated by the callee SIP node of FIG. 1.

As shown in FIGS. 2 and 4, the callee ROUTE SET signature may be inserted as a URI parameter into the RECORD-ROUTE header of the SIP node generating the signature. For example, SIP node 300 may generate a callee ROUTE SET signature 560 based upon the URI portions of RECORD-ROUTE headers 522, 520 and the CONTACT header 518 in the request 500. The SIP node 300 may insert the callee ROUTE SET signature 560 into the RECORD-ROUTE header 524 of SIP node 300 as a URI parameter. As noted above, the URI portions of the RECORD-ROUTE headers and CONTACT header of a dialog-initiating request from a caller are stored and echoed by a callee SIP node in ROUTE headers to provide routing instructions for any future requests generated by the callee within the dialog. Thus, as shown in FIG. 6, when SIP node 402 forms a request, it may copy the URI portion of RECORD-ROUTE header 524 into ROUTE header 724 of SIP node 300 under standard SIP processing. As the URI portion of the RECORD-ROUTE header is echoed, the standard route information is copied as well as any URI parameters including the callee ROUTE SET signature 560.

To validate the received callee ROUTE SET signature 760 of FIG. 6, the SIP node 300 may strip and save the received callee ROUTE SET signature 760. The SIP node 300 may generate a validation ROUTE SET signature using the same procedures used to generate the callee ROUTE SET signature 560 inserted into the dialog-creating request, here an INVITE. In accordance with the generation of the callee ROUTE SET signature 560 discussed above, the SIP node 300 may identify the RECORD-ROUTE headers in the received request 700 and generate the validation ROUTE SET signature based upon all the ROUTE headers present in the request except that of the receiving SIP node. In this manner, the validation ROUTE SET signature may be based upon those RECORD-ROUTE headers and CONTACT header which were known by SIP 300 when it generated the callee ROUTE SET signature 560 in the request message 500. For example, in the set up of FIG. 1, the validation ROUTE SET signature for SIP node 300 could be based upon ROUTE header 722 of SIP node 250, ROUTE header 720 of SIP node 200 and ROUTE header 718 based upon the CONTACT header identifying the caller SIP node 102. The SIP node 300 may compare the validation ROUTE SET signature with the received callee ROUTE SET signature 760. If the signatures do not match, SIP node 300 may send an error message if allowed by the protocol, remove the request 700 from its processing stack, increment a signature failure performance counter, and/or take any other appropriate action. If the signatures do match, SIP node 300 may continue normal processing under the SIP standard and forward the request to the next SIP node indicated in the ROUTE headers of the request headers 704.

In some cases the callee ROUTE SET signature may be generated and/or validated at each step of the route, e.g., at each SIP node processing the request. However, to reduce the computational burden on SIP node servers, the request may be validated only when it is required.

For example, if a request does not contain any RECORD-ROUTE headers, e.g., not even the current processing SIP node has added a RECORD-ROUTE header, then a callee ROUTE SET signature may not be generated. More particularly, if the SIP node processing the request has not requested to remain "in-the-loop" for further communication between the callee and the caller, then that SIP node may not desire to verify routing instructions in future received message.

In a further example, if the request contains RECORD-ROUTE headers but does not have one CONTACT header, then the SIP node may not desire validation of any response or request echoing those RECORD-ROUTE headers. This may occur in some cases including some types of ACK and CANCEL SIP messages. More particularly if the received request includes at least one RECORD-ROUTE header and zero CONTACT headers, then a callee ROUTE SET signature may not be generated and normal processing of the message may continue.

In an additional example, the message may be validated when it is received over an untrusted connection since requests from untrusted links may be more likely sources of denial of service attacks. If requests from the callee received over trusted links will not be validated, then a callee ROUTE SET signature 560 does not need to be generated when the dialog-initiating request from the caller will be forwarded to the next SIP node over a trusted link. For example as shown in FIG. 1, SIP node 200 will receive the request 700 over a trusted connection, or in other words, SIP node will not receive the request 700 over an untrusted connection. Therefore, this node may not generate or insert a callee ROUTE SET signature within the headers 504 of the INVITE request since it may have no requirement to validate the route of any requests from the callee. Consequently, before generating the callee ROUTE SET signature, the SIP node may determine if validation of any callee request is required. If the callee request would not be verified, e.g., the current request would be received over a trusted connection, then no callee ROUTE SET signature needs to be generated and normal processing of the SIP request may continue. However, if the callee request would be received at the SIP node over an untrusted connection, then the callee ROUTE SET signature may be generated as discussed above. Similarly, during verification of the callee ROUTE SET signature, a processing SIP node may first determine if the received request from the callee is over an untrusted connection. If so, then the callee ROUTE SET signature may be validated, if present. For example, SIP node 300 may determine if the request 700 is received over an untrusted connection. As shown in FIG. 1, link 312 is an untrusted connection. As a result, SIP node 300 may then identify the ROUTE header 724 of the SIP node 300 within the header 704 of the request 700 shown in FIG. 6. The SIP node 300 may determine if a signature is present within the identified ROUTE header 724, and verify that signature if present.

A SIP node may additionally or alternatively desire validation of the routing instructions for an in-dialog request generated by a caller subsequent to the dialog-initiating request. Accordingly, an SIP node may generate a signature based upon at least a portion of at least one of the RECORD-ROUTE headers of a response to a dialog-initiating request and then validate that signature in a subsequent request from the caller to ensure the integrity of the routing instructions of the request.

To ensure the integrity of the route to be traveled by the caller request, the SIP node may generate a caller ROUTE SET signature based upon the URI portions of the RECORD-ROUTE headers and the CONTACT header contained in the header fields of the received response. If more than one CONTACT header is present, the caller ROUTE SET signature may be based upon the selected URI portions of the RECORD-ROUTE headers and the URI portion of the first listed CONTACT header. More particularly, for the response message 600 shown in FIGS. 1 and 5, SIP node 200 may provide a caller ROUTE SET signature based upon the URI portion of RECORD-ROUTE header 622 of SIP node 250, the URI portion of RECORD-ROUTE header 624 of SIP node 300, and the URI portion of CONTACT header 618 of the callee Bob. The generated caller ROUTE SET signature may be stored within the message and transferred to the caller SIP node 102 for storage and use within any requests generated by the caller SIP node 102 that belong in the same dialog. It is to be appreciated that any suitable combination of RECORD-ROUTE headers and other header information may be signed to authenticate the routing instructions in any subsequent request generated by the caller SIP node 102. The caller ROUTE SET signature inserted into the response header 604 may be any data or signal indicative of the generated digital signature including a predetermined number of significant bits of the signature blob and the entire digital signature.

To ensure that the caller ROUTE SET signature generated during processing of the response is present for verification in subsequent requests generated by the caller SIP node 102, the generated caller ROUTE SET signature may be inserted as a URI parameter into an echoed header of the response. Thus, as the client SIP node 102 generates a new request based upon the echoed headers from the SIP response, the generated signatures are automatically transferred. Consequently, the SIP node receiving the request may validate the signature transferred to the request header. It is to be appreciated that any echoed header portion or custom header which is echoed by a client SIP node based on prior agreement may be suitable for storing the caller ROUTE SET signature for validation by a SIP node.

As shown in FIG. 5, the caller ROUTE SET signature may be inserted into the RECORD-ROUTE header of the SIP node generating the signature. For example, SIP node 200 may generate a caller ROUTE SET signature 660 based upon the URI portions of RECORD-ROUTE headers 622, 624 and the CONTACT header 618 in the response 600. The SIP node 200 may insert the caller ROUTE SET signature 660 into the RECORD-ROUTE header 620 of SIP node 200. As noted above, the URI portions of RECORD-ROUTE headers and CONTACT header of a response to a dialog-initiating request are stored and echoed by a caller SIP node in ROUTE headers to provide routing instructions for any future requests generated by the caller within the dialog. Thus, as shown in the example request 800 of FIG. 7, when SIP node 102 forms a subsequent request in that dialog, it may copy the URI portion of RECORD-ROUTE header 620 into the ROUTE header 820 of SIP node 200 under standard SIP processing. As the URI portion of the RECORD-ROUTE header is echoed, the standard route information is copied as well as any URI parameters including the caller ROUTE SET signature 660.

Figure 7:
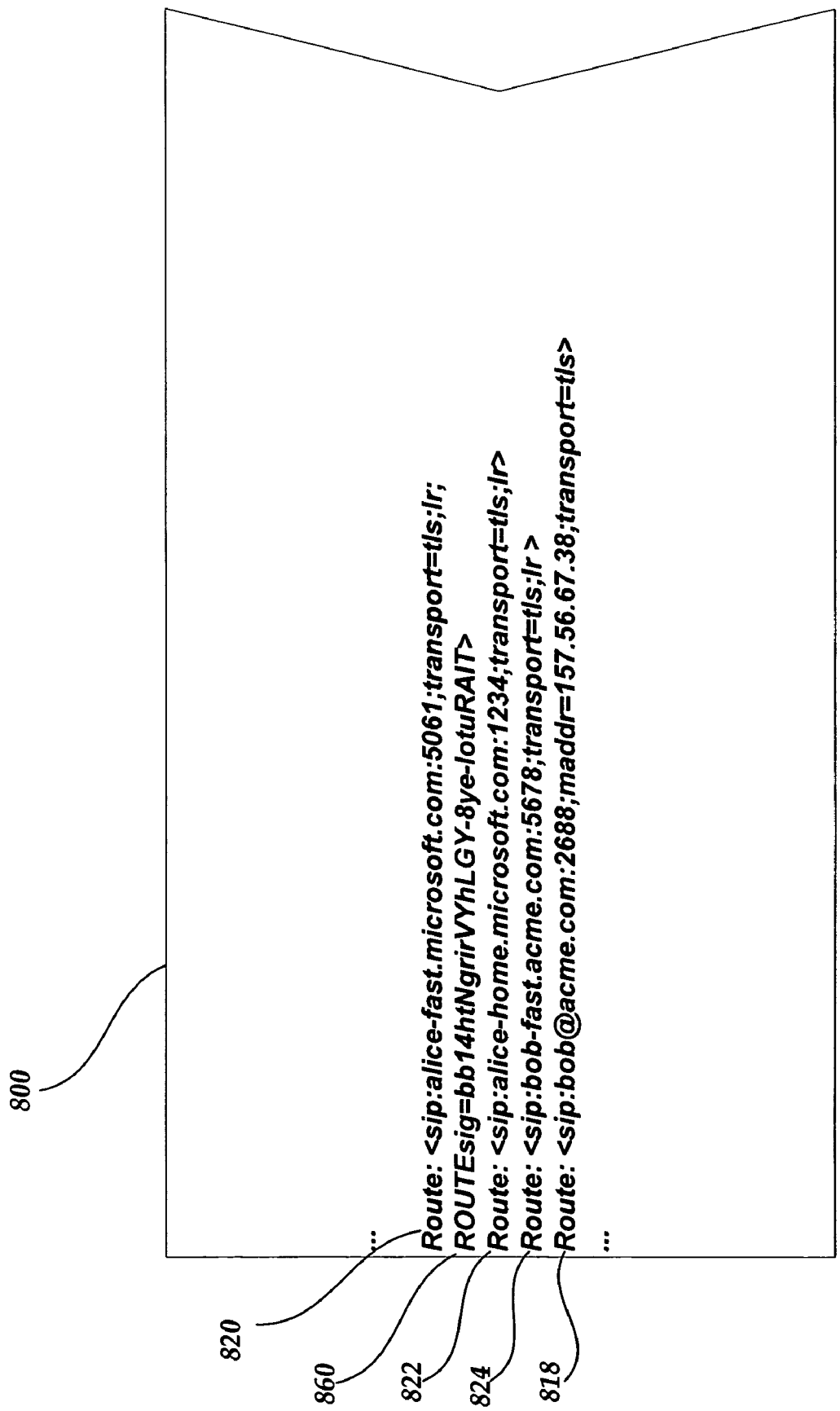
FIG. 7 is an example request generated by the caller SIP node of FIG. 1.

To validate the received caller ROUTE SET signature 860 of FIG. 7, the SIP node 200 may strip and save the received caller ROUTE SET signature 860 shown in FIG. 7. The SIP node 200 may generate a validation ROUTE SET signature using the same procedures used to generate the caller ROUTE SET signature 660 inserted into the response to a dialog-creating request. In accordance with the generation of the caller ROUTE SET signature 660 discussed above, the SIP node 200 may identify the RECORD-ROUTE headers in the received request 800 and generate the validation ROUTE SET signature based upon all the ROUTE headers present in the request except the ROUTE header of the receiving SIP node. In this manner, the validation ROUTE SET signature may be based upon those RECORD-ROUTE headers and CONTACT header which were known by SIP 200 when it generated the caller ROUTE SET signature 660 in the response message 600. Consequently, the validation ROUTE SET signature for SIP node 200 would be based upon the ROUTE header 822 of SIP node 250, ROUTE header 824 of SIP node 300 and ROUTE header 818 based upon the CONTACT header identifying the callee SIP node 402. The SIP node 200 may compare the validation ROUTE SET signature with the received caller ROUTE SET signature 860. If the signatures do not match, SIP node 200 may send an error message if supported by the protocol, remove the request 800 from its processing stack, increment a signature failure performance counter and/or take any other appropriate action. If the signatures do match, SIP node 200 may continue normal processing under the SIP standard and forward the request to the next SIP node indicated in the ROUTE headers of the request headers 804.

In some cases the caller ROUTE SET signature may be generated and/or validated at each step of the route, e.g., at each SIP node processing the response and/or request, respectively. However, as noted above with respect to the VIA signature and the caller ROUTE SET signature inserted into a request, the computational burden on SIP node servers may be reduced by requiring caller ROUTE SET signature verification in a request only when it is required.

For example, if a response to a request does not contain any RECORD-ROUTE headers, e.g., not even the current SIP node has added a RECORD-ROUTE header, then a caller ROUTE SET signature may not be generated. More particularly, if the SIP node processing the response has not requested to remain "in-the-loop" for further communication between the caller and callee, then that SIP node may not desire to verify routing instructions in further messages.

In a further example, if the response contains RECORD-ROUTE headers but does not have one CONTACT header, then the SIP node may not desire validation of any response or request echoing those RECORD-ROUTE headers. More particularly, if the received response includes at least one RECORD-ROUTE header and zero CONTACT headers, then a caller ROUTE SET signature may not be generated and normal processing may continue.

In an additional example, the ROUTE SET headers of a caller request may be validated when they are is received only over an untrusted connection. If requests received over trusted links will not be validated, then a caller caller ROUTE SET signature 660 does not need to be generated when the response will be forwarded to the next SIP node over a trusted link. Similarly, after receiving a request from the caller, the ROUTE SET signature does not need to be validated if received over a trusted connection.

As noted above, RECORD-ROUTE headers are included in a dialog-initiating request and its corresponding response to generate the callee and caller ROUTE SET headers used to route subsequent requests. Thus, in some cases, an SIP node may validate the RECORD-ROUTE headers in a response to a dialog-initiating request to ensure the integrity of those RECORD-ROUTE headers. For example, an attaching node may tamper with the RECORD-ROUTE headers in a request and consequently, a subsequent SIP node may sign across the fraudulent RECORD-ROUTE headers, thereby giving rise to a ROUTE header with a valid ROUTE SET signature but based upon fraudulent routing information. Accordingly, a SIP node may generate a signature based upon at least a portion of at least one of the RECORD-ROUTE headers of a request and then validate that signature in the response from the callee to ensure the integrity of the RECORD-ROUTE headers of the message.

To ensure the integrity of the set of RECORD-ROUTE headers, the SIP node may generate a RECORD-ROUTE signature based upon the URI portions of the RECORD-ROUTE headers contained in the header fields of the received request. More particularly, for the INVITE message 500 shown in FIGS. 1, 2, and 4, SIP node 300 may provide a RECORD-ROUTE signature 570 based upon the URI portion of the RECORD-ROUTE header 522 of SIP node 250 and the URI portion of the RECORD-ROUTE header 520 of SIP node 200. In contrast to the callee ROUTE SET signature described above, the RECORD-ROUTE signature 570 does not include the CONTACT header, since the callee, under SIP standards, will not echo the CONTACT header 518 in the response. The generated RECORD-ROUTE signature 570 may be stored within the message and transferred to the response message and validated when the response is processed through the SIP node. It is to be appreciated that any suitable combination of RECORD-ROUTE headers and other header information may be signed to authenticate the routing instructions in the response generated by the callee SIP node 402. The RECORD-ROUTE signature 570 inserted into the request header 504 may be any data or signal indicative of the generated digital signature including a predetermined number of significant bits of a signature blob and the entire digital signature itself.

To ensure that the RECORD-ROUTE signature generated during processing of the request is present for verification in the response generated by the callee SIP node 402, the generated RECORD-ROUTE signature 570 may be inserted as either a header parameter or URI parameter into an echoed header of the request. Thus, as the client SIP node 402 generates a response based upon the echoed headers from the SIP request, the generated signatures are automatically transferred from the request to the response. Consequently, the SIP node receiving the response may validate the signature transferred to the response header. It is to be appreciated that any echoed header or custom header which is echoed by a client SIP node based on prior agreement may be suitable for storing the RECORD-ROUTE signature for validation by a SIP node.

As shown in FIG. 4, the RECORD-ROUTE signature may be inserted into the RECORD-ROUTE header of the SIP node generating the signature. For example, SIP node 300 may insert the RECORD-ROUTE signature 570 as a header parameter into the RECORD-ROUTE header 524 of SIP node 300. As noted above, the RECORD-ROUTE headers are echoed back in the response headers 604. Thus, when SIP node 402 forms a response, such as a response 600 shown in FIG. 5, it may copy the RECORD-ROUTE header 524 into RECORD-ROUTE header 624 of SIP node 200 under standard SIP processing. As the RECORD-ROUTE header is echoed, the standard information is copied as well as any header parameters including the RECORD-ROUTE signature 570.

To validate the received RECORD-ROUTE signature 670 of FIG. 5, the SIP node 300 may strip and save the received RECORD-ROUTE signature 670. The SIP node 300 may generate a validation RECORD-ROUTE signature using the same procedures used to generate the RECORD-ROUTE signature 570 inserted into the corresponding request, here an INVITE. In accordance with the generation of the RECORD-ROUTE signature 570 discussed above, the SIP node 300 may generate the validation RECORD-ROUTE signature based upon the URI portion of the RECORD-ROUTE header 622 of SIP node 250 and the URI portion of the RECORD-ROUTE header 620 of SIP node 200. The SIP node 300 may compare the validation RECORD-ROUTE signature with the received RECORD-ROUTE signature 670. If the signatures do not match, SIP node 300 may send an error message if supported by the protocol, remove the response 600 from its processing stack, and/or increment a signature failure performance counter. If the signatures do match, SIP node 300 may continue normal processing under the SIP standard and forward the response to the next SIP node indicated in the VIA headers of the response headers 604.

In some cases the RECORD-ROUTE headers of the response may be validated at each step of the route, e.g., at each SIP node processing the response. However, to reduce the computational burden on SIP nodes, the response may be validated only when it is required, similar to that described above with reference to the VIA signature 650. For example, if a request does not contain any RECORD-ROUTE headers, then a RECORD-ROUTE signature may not be generated. In an additional example, if the connection to the next SIP node is a trusted connection, then a RECORD-ROUTE signature may not be generated. To reduce the burden on communication systems, the SIP node may remove the RECORD-ROUTE signature from the RECORD-ROUTE header after verification and before forwarding the response to the next SIP node.

To generate a signature based upon at least a portion of the headers in a SIP message, the SIP node requiring validation and verification capabilities may include a cryptographic program which executes on a central processing unit to perform certain cryptographic functions, including encryption, decryption, signing, and/or verification. As an example, the cryptographic program may be capable of generating and destroying cryptographic keys, such as symmetric keys that are used to add random data when computing a signature, or used for encryption/decryption purposes. Alternatively, the cryptographic program may have access to an asymmetric (public/private) key pair. In a typical asymmetric key pair, a public key may be used to encrypt information and the corresponding private key may be used to decrypt the information. A digital signature may be generated using the private key and that signature may be authenticated using the public key. It should be appreciated that any one-way hashing mechanism may be suitable for generating signatures based upon SIP headers, including either alone or in combination, MD5, salt, HMAC, SHA1, and RSA based upon many factors such as resilience to attack, relative speed, and computational burden for generation of the associated signature. It is also to be appreciated that the entire signature blob, portion of the signature blob, or an encoded version of the signature blob using any encoding scheme may be inserted as the VIA, RECORD SET, and/or RECORD-ROUTE signature. In one example, the signature may be a 16 byte one way MD5 hash of the selected portion of the SIP message headers and any other information, including random number and/or session key. The signature based upon SIP headers may be generated with the relevant headers in any particular order, as long as that order remains consistent between the signature generation and validation.

The VIA signature, the ROUTE SET signatures and the RECORD-ROUTE signature processed by the same SIP node may each be generated by the same session key. Alternatively, keys of differing resilience and speed may be used for each signature or any combination of signatures. For example, since the VIA signature and/or RECORD-ROUTE signature will typically be verified fairly quickly, e.g., in the corresponding response, the VIA key used to generate the VIA signatures may be a fairly lightweight key/cryptographic solution with a fairly small computational burden. However, since the ROUTE SET headers may continue to be verified through the entire dialog, the ROUTE SET key may be a heavy weight key/cryptographic solution that is less vulnerable to attack than a light weight key/cryptographic solution.

A session key for generating a signature may itself be generated and used for all dialog requests and/or responses processed within a certain timeframe by a particular SIP node. Alternatively, each dialog may be issued a particular session key, which may be the same as or different from other dialog session keys used by that SIP node and may be the same as or different from the dialog session keys used by other SIP nodes. The session keys may be destroyed by the cryptographic program after a predetermined period of time, at the end of a dialog, and/or upon receiving an indication of key and/or header corruption.

Each SIP node may generate its own session key, such as a VIA key for generating VIA signatures, a ROUTE key for generating ROUTE SET headers, and a RECORD-ROUTE key for generating RECORD-ROUTE signatures. Alternatively, a session key may be accessible by each of the SIP nodes, such as through a certificate for a public/private key pair, so that each type of header is signed using the same key.

To reduce the vulnerability of the sessions keys used to generate the signatures, the keys may be refreshed from time to time. For example, the session key may be refreshed every 4 hours. However, to ensure that dialogs are allowed to continue even after the session key is refreshed, the cryptographic program of the SIP node may store and maintain previous session keys. The stored keys may be stored for a predetermined length of time, such as within the range of approximately 5 minutes to approximately 24 hours for the RECORD-ROUTE and ROUTE SET keys and within the range of approximately 5 minutes to approximately 30 minutes for the VIA keys. Additionally or alternatively, the session keys may be saved until all messages signed using that key have been verified. To ensure that the correct key is accessed to verify a signature, the cryptographic program may insert a key identifier into the signature and/or append a key identifier as an additional parameter in an echoed SIP header.

In some cases, a SIP node processing SIP messages may be provided by a pool of servers. However, there is no guarantee that the same server which verifies a signature will be the same one that generated the signature. Thus, the servers within a pool of servers may need to communicate the key used to generate the signatures so that other servers within the pool may verify those signatures if used to process the message. In one example, the servers may send the key to each other or may access the appropriate key from a key service through a certificate or other suitable method. However, servers within a pool of servers generally minimize communication between themselves to reduce contamination and accessing a key service may increase message processing time. Thus, to securely transfer the session key from the signature generating server to the signature verifying server, the server generating the signature(s) may append an encrypted and signed session key to an echoed header of the message with the signature.

For example, the SIP node 300 may be provided by a pool of servers including a first server 300A and a second server 300B as shown in dotted line in FIG. 1. In some cases the request 500 may be routed through SIP node 300A and subsequent in-dialog requests 700 from the callee may be routed through SIP node 300B. Consequently, to verify the ROUTE SET signature 760 in the in-dialog request, SIP node 300B needs to know the key used by SIP node 300A to generate the ROUTE SET signature 560. As shown in the example request RECORD-ROUTE headers of FIG. 4, a RECORD-ROUTE header, such as RECORD-ROUTE header 534, may include the typical network location information under standard SIP processing, the ROUTE SET signature 560 generated by SIP node 300A, and data representing the ROUTE SET key 580 used by SIP node 300A to generate the signature 560.

However, to ensure that other SIP nodes do not have access to the ROUTE SET key 580 in the message header, SIP node 300A may encrypt the ROUTE SET key with a public key. Correspondingly, to verify the integrity of that encryption, SIP node may sign the encrypted ROUTE SET key with a private key. SIP node 300A may then insert the encrypted and signed session key into an echoed header, such as a URI parameter of a RECORD-ROUTE header, to distribute a secure session key to a server having access to the public/private key pair used to encrypt and sign the session key. The encrypted session key and signed session key may be inserted as a single parameter or as multiple parameters.

In some cases, it may be desired to utilize two pairs of public/private key pairs to secure the session key in the message headers. For example, a first public/private key pair and a second public/private key pair may be installed or accessible through a certificate system. At a SIP node generating a signature, a first public key of a first public/private key pair may be used to encrypt the session key and a second private key of a second public/private key pair may be used to sign the session key. In this manner, a receiving SIP node with access to both public/private key pairs may use the second public key of the second public/private key pair to verify the validity of the signature and may use the first private key of the first public/private key pair to decrypt the session key.

The encryption and signature of the session key by the public/private key pair may be computationally intensive. Thus, to reduce the burden on an SIP node, the signed encrypted session key may be stored in a key database associated with the decrypted key information, a date/time stamp of the creation of the key, the expiration date/time of the key and or any other information. In this manner, the encryption/signature may not need to be computed prior to each transmission.

For example, as shown in FIG. 6, when SIP node 300B receives the request 700 with ROUTE SET header 724 containing the ROUTE SET signature 760, SIP node 300B may examine the ROUTE SET signature to identify which ROUTE SET key was used to generate the signature 560. In some cases, SIP node 300B may access a database of stored keys to verify if it has the identified ROUTE SET key 580 stored therein. If the ROUTE SET key is not stored, then SIP node 300B may access the public/private key pair to determine the ROUTE SET key from the ROUTE SET header. More particularly, the SIP node 300B may use a certificate service to access the public/private key pair or may retrieve the public/private key pair from a database or through any suitable method or process. Using the public key, SIP node 300B may authenticate the signature of the session key. The SIP node 300B may also use the private key to decrypt the ROUTE SET key 580 and then use that decrypted session key to generate the validation ROUTE SET signature. In a similar manner, the session keys used to generate the VIA headers and the RECORD-ROUTE headers may be inserted into an echoed header, and more particularly, may be inserted into the echoed header containing the signature generated by that session key.

The session key may be encrypted alone or other information may be included with the session key before encryption with the public key. Similarly, the encrypted session key may be signed alone or, alternatively, the encrypted session key blob may be appended with other information which may be encrypted or unencrypted before the totality is signed with the private key. In this manner, other information, such as a key identifier, a session key expiration date, or any other information desired to be transmitted with the encrypted/signed session key. Additional information may be appended to the encrypted/signed session key and may be encrypted and/or signed using the same public/private key pair or other suitable encryption process.

In some cases, the SIP node receiving the signed and encrypted session key may validate the expiration time and/or date of the session key. In this regard, the SIP node 300A may encrypt and sign the session key along with a date and/or time stamp of the creation of the session key. When SIP node 300B receives the in-dialog request, it may authenticate the signature of the session key and date/time stamp and decrypt them as noted above. In addition, SIP node 300B may compare the date/time stamp of the session key with the expected lifetime of the key or with a stored expiration date/time. If the key is expired, SIP node 300B may send an error message if supported, may remove the message from its processing stack, and/or may take any other suitable action. If drop key is active, then SIP node 300B may continue to use the decrypted key to validate the corresponding signature in the message.

In a comprehensive example shown in FIG. 1, the SIP node 300 may generate a VIA signature and insert that signature into an echoed header, such as a header parameter of the VIA header of the request 500. The VIA signature may then be validated at SIP node 300 when the callee sends a response 600 to that request. Similarly, if the request is a dialog-initiating request, the SIP node 300 may generate a RECORD-ROUTE signature and insert that signature into an echoed header, such as a header parameter of the RECORD-ROUTE header of the request 500. The RECORD-ROUTE signature may then be validated at SIP node 300 when the callee sends the response 600 to the dialog-initiating request. Moreover, if the request is a dialog-initiating request, the SIP node 300 may also generate a callee ROUTE SET signature and insert that signature into an echoed header, such as a URI parameter of the RECORD-ROUTE header of the request 500. This ROUTE SET signature may be saved at by the callee SIP node to be used as a set of ROUTE headers in any future requests generated by the callee in that dialog. Thus, the callee ROUTE SET signature is not validated until used by the callee in a request. Similarly, in a response to a dialog-initiating request, the SIP node 200 may generate a caller ROUTE SET signature and insert that signature as a URI parameter of the RECORD-ROUTE header of the SIP node 200. The caller ROUTE SET signature may be saved by the caller SIP node to be used in the set of ROUTE headers for any requests generated by the caller SIP node. In this manner, the caller ROUTE SET signature may not be verified until it is transmitted in a request from the caller.

An example implementation of a the SIP node server will now be described with reference to FIGS. 8-14.

Any combination of the caller SIP node 102, SIP node 200, the SIP node 250, the SIP node 300 and/or the callee SIP node 402, illustrated in FIG. 1, may be present and operating on one or more computers or other devices acting as a SIP node processor. Each of these nodes may be provided wholly or partially on multiple computer systems or other devices and/ or may be networked together using any method known in the art including wire connection, wireless connections, and the like to provide the processes discussed above.

In the illustrated embodiment, the SIP node 300 is provided by a node server 1300 which will be discussed below with reference to FIGS. 8-14. The SIP node 102, the SIP node 250, the SIP node 200, and the SIP node 402 may be provided by similar server/computer systems.

Figure 8:
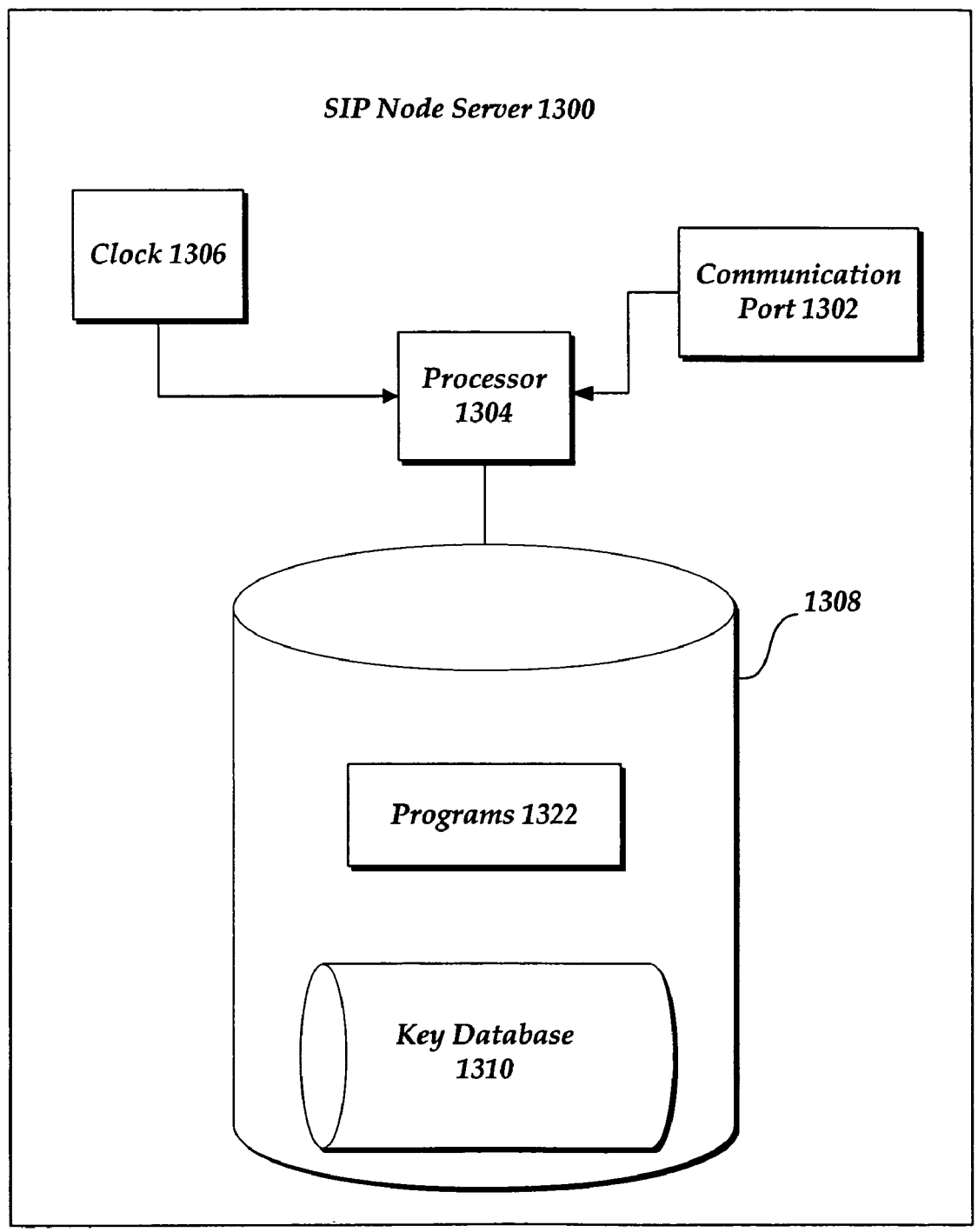
FIG. 8 is a diagram of an example SIP server in accordance with one embodiment of the invention.

As shown in FIG. 8, the node server 1300 may include one or more communication ports 1302 which may include one or more processors 1304, an internal date and time clock 1306, and storage 1308 which includes one or more computer programs 1322 defining instructions, which when executed, instruct the computer to perform the operations of the SIP node 300. The storage also may include a key database 1310 which will now be described in more detail in connection with FIG. 9 and the programs 1322 will be discussed further below with respect to FIGS. 10-14.

Figure 9:
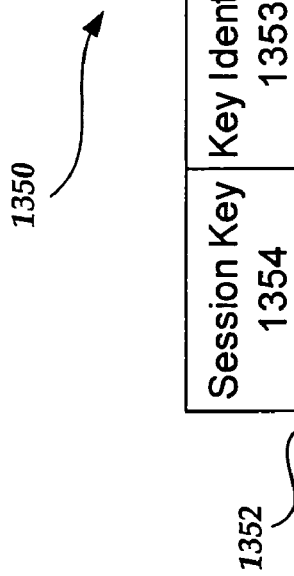
FIG. 9 is a diagram of an example table from a database of key information in accordance with one embodiment of the invention.

FIG. 9 illustrates an example table 1350 for the key database 1310, which includes one or more records 1352. In general, each record associates a session key 1354 with additional information about the key. In this example, each record 1352 includes a key identifier 1353, a session key 1354, an encrypted key 1356 which is encrypted with a public key, a date/time of creation 1358, and a date/time of expiration 1360. The SIP node 300 may generate the session key 1354; however, the SIP node may identify the session key from the message itself, retrieve it from a key service or through any method suitable for generating a session key to be used for signing data. Similarly, the remaining data may be initialized and updated as SIP node 300, the message itself, or other system provides the key information.

The key database may be any kind of database, including a relational database, object-oriented database, unstructured database, an in-memory database, or other database. A database may be constructed using a flat file system such as ASCII text, a binary file, data transmitted across a communication network, or any other file system. Notwithstanding these possible implementations of the foregoing databases, the term database as used herein refers to any data that is collected and stored in any manner accessible by a computer.

Now referring to FIGS. 10-14, the various operations performed by the SIP node 300 will now be described. More particularly, the generation of a VIA signature is described with reference to FIG. 10 and the verification of a VIA signature is described with reference to FIG. 11. The generation of RECORD-ROUTE and ROUTE SET signatures is described with reference to FIG. 12 and the validation of those signatures is described with reference to FIG. 13. FIG. 14 illustrates the operations to import a session key from one server to another in a pool of servers.

Figure 10:
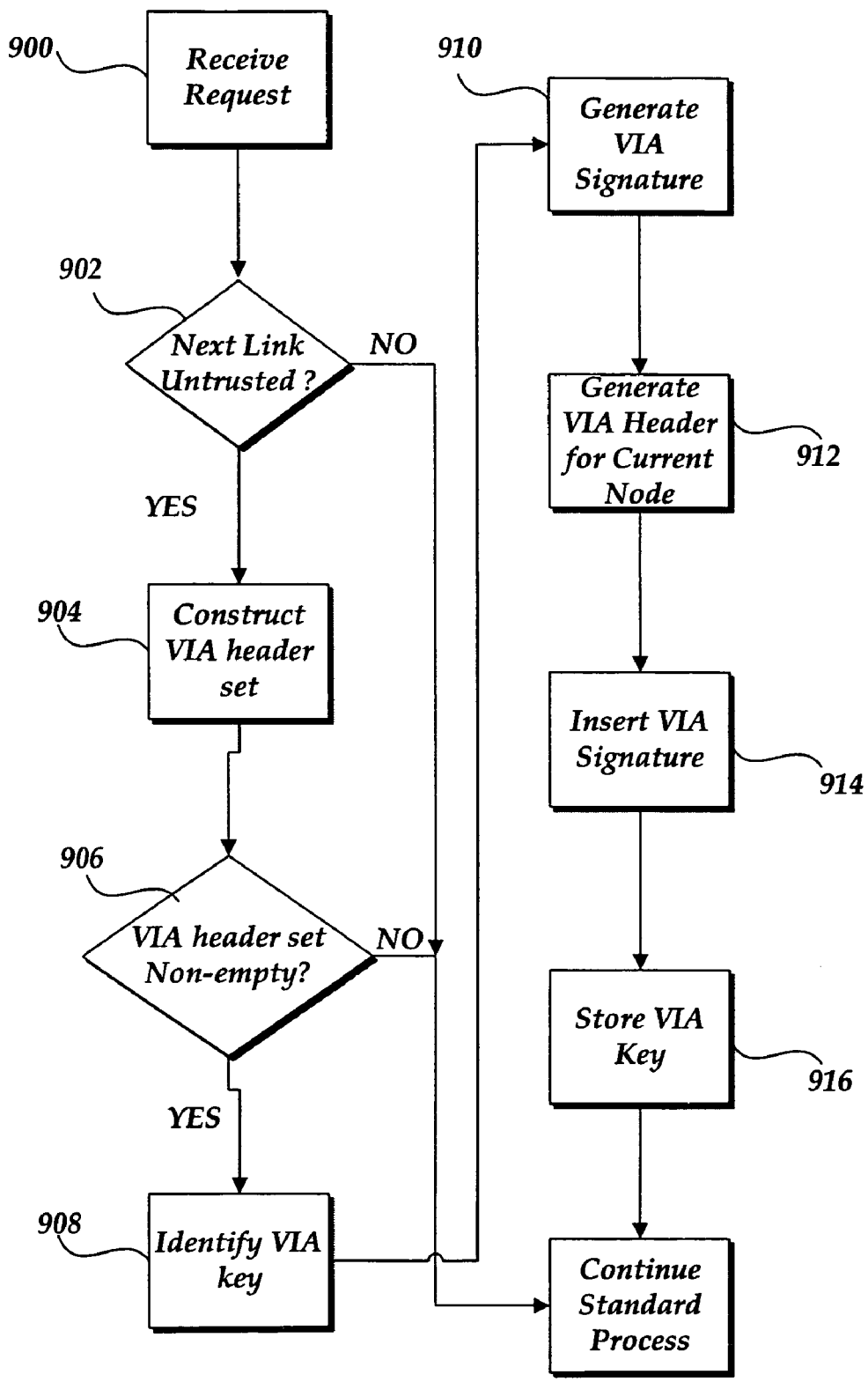
FIG. 10 is a flowchart describing how a VIA signature may be generated in accordance with one embodiment of the invention.

Referring to FIG. 10, the operations to generate a VIA signature include, but are not limited to, receiving 900 an SIP request. Although the Figures above are discussed with reference to an INVITE request, the VIA signature may be generated for all requests or selected requests depending on the security and processing requirements of the system. The SIP node may determine 902 if the link over which the response will be forwarded is an untrusted link. If the link is trusted, then the SIP node may continue standard processing of the request under SIP standard processes. If the forwarding link is untrusted, the operations may include constructing 904 a VIA header set of all the received VIA headers in order except for the VIA header of the processing node. Specifically, the request may be examined and the VIA headers present in the received message may be stored in the server 1300 memory. If the VIA header set is empty (906), then standard processing of the message may be continued. If more than one VIA header is present, the operations also include identifying 908 a VIA key, which as noted above may be generated by the server 1300, accessed from the message itself (discussed further below with reference to FIG. 14), or retrieved from a key service through means such as the Internet. The VIA signature may then be generated 910 and may include calling a cryptographic program to generate a hash of the VIA header set stored in memory. The VIA header for the processing SIP node 300 may be generated 912 and the VIA signature may be inserted 914 as a header parameter into the VIA header for the SIP node 300. The server 1300 may store 916 the VIA session key in the key database discussed above with reference to FIG. 9 and may initialize or update the key parameters such as the key identifier, the key date/time creation, the expiration date/time, the encrypted key, and/or other information.

Figure 11:
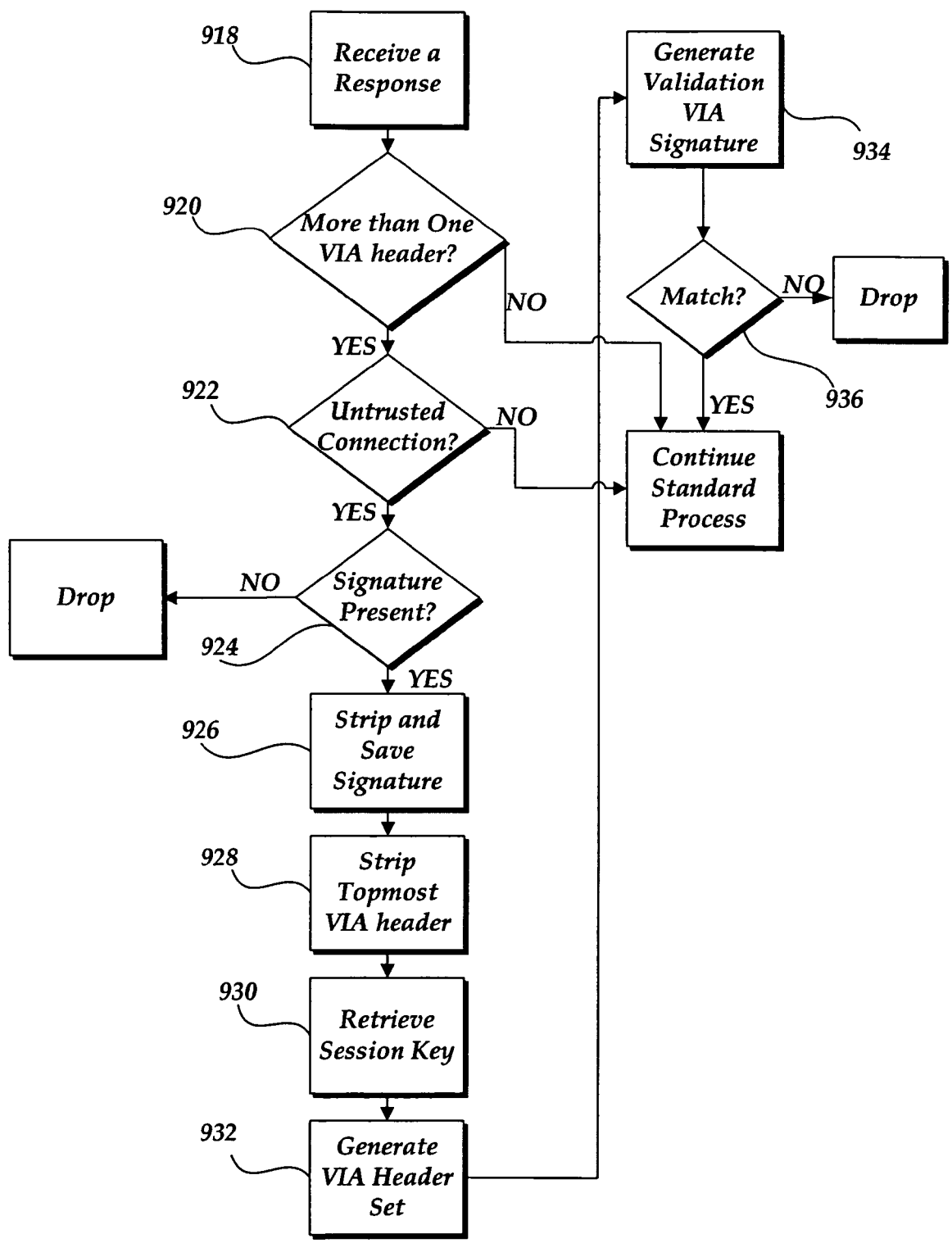
FIG. 11 is a flowchart describing how to verify a VIA header in accordance with one embodiment of the invention.

Referring to FIG. 11, after generating the VIA signature in the request, the SIP node may receive 918 a response in reply to the request previously processed. The server may examine the VIA headers of the response and determine 920 if more than one VIA header is present. If only one VIA header is present, then standard processing of the message may continue. If more than one VIA header is present, then the SIP node may determine 922 if the response was received over a trusted or untrusted connection. If the link is trusted, then standard processing of the message may continue. If the link is untrusted, then the SIP node 300 may examine the VIA header for SIP node 300 and determine 924 if a signature is present. If no signature is present, then SIP node 300 may drop the message from its processing stacks. If a signature is present, the SIP node 300 may strip the signature from the header and save 926 the VIA signature to memory and then strip 928 the topmost VIA header (e.g., the VIA header of the SIP node 300) from the message. The SIP node may retrieve 930 the appropriate VIA session key from the key database, a key service or the message itself. The appropriate key may be selected based upon an identifier apparent in the signature itself, the date/time of the message, the type of signature (e.g., VIA) or any other parameter suitable for identifying the appropriate VIA session key. The SIP node may generate 932 a VIA header set of the remaining VIA headers present in the response. If the VIA signature was generated with the VIA headers in the order given in the message, the verification VIA header may be generated in the same order to ensure proper ordering of the signature parameters. The operations also include generating 934 a VIA validation signature based on the VIA header set and the retrieved session key, and then comparing 936 that validation VIA signature with the stored VIA signature. If the VIA signatures match, then standard processing of the message may continue. If they signatures do not match, then the SIP node may drop the message from its processing stack or take any other suitable action.

Figure 12:
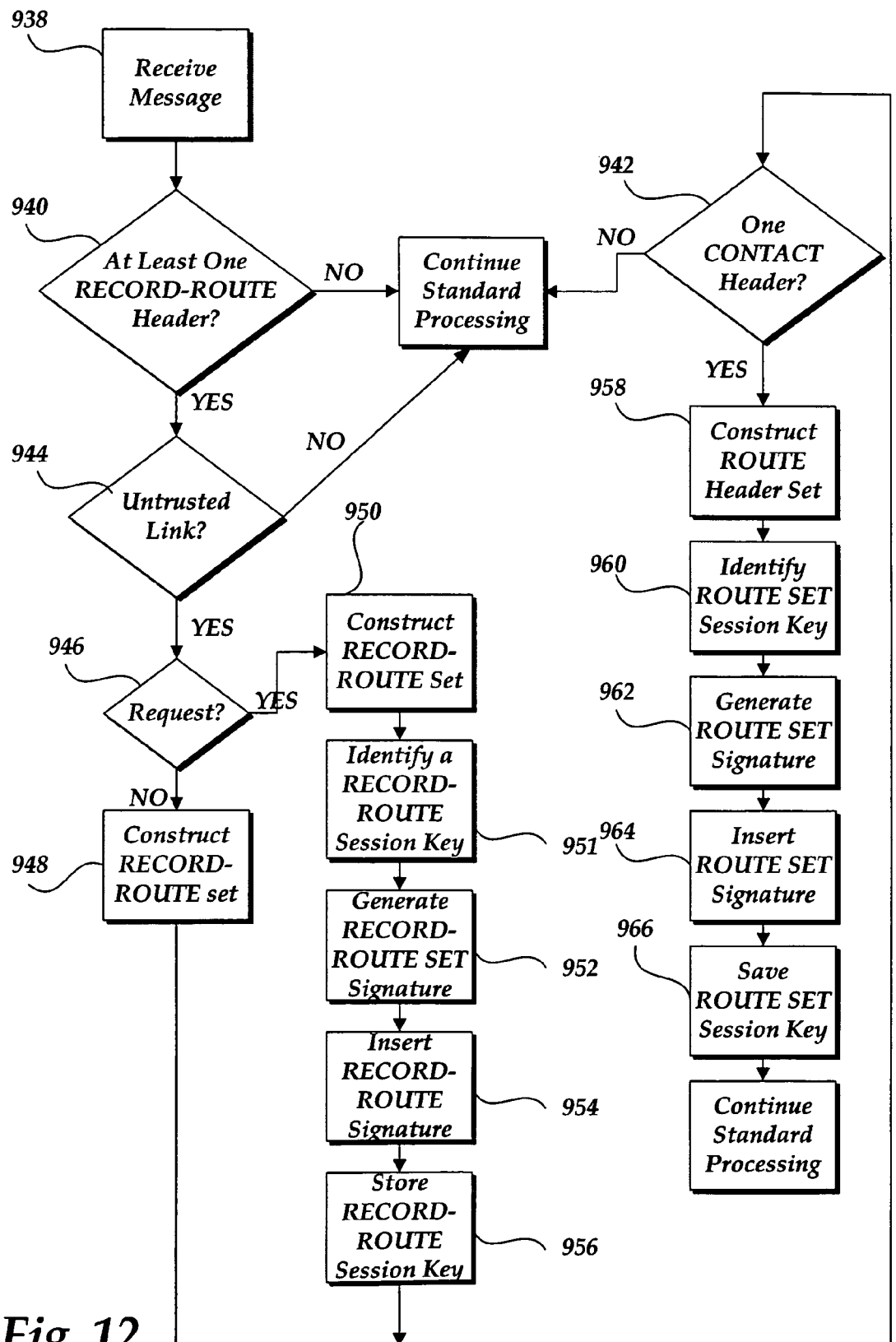
FIG. 12 is a flowchart describing how a ROUTE SET signature and a RECORD-ROUTE signature may be generated in accordance with one embodiment of the invention.

Referring to FIG. 12, the operations to generate the ROUTE SET and RECORD-ROUTE signatures include receiving 938 a message at the SIP node and determining 940 if the message contains at least one RECORD-ROUTE header. If the message does not contain any RECORD-ROUTE headers, then standard processing of the message may continue. Otherwise, the SIP server may determine 944 if a message will be transmitted over a trusted or untrusted link. More particularly, the SIP server may determine if the message to be validated will be received over a trusted or untrusted link. If the response link is trusted, then standard processing may continue. If the link is untrusted, then the SIP server may determine 946 if the received message is a request. If the message is not a request, then the SIP server may construct 948 a RECORD-ROUTE header set based upon the RECORD-ROUTE headers in the response. If the message is a request, then the SIP server may construct 950 a RECORD-ROUTE header set and identify 951 a RECORD-ROUTE session key which as noted above may be generated by the server 1300, accessed from the message itself (discussed further below with reference to FIG. 14), or retrieved from a key service through means such as the Internet. The RECORD-ROUTE signature may then be generated 952 and may include calling a cryptographic program to generate a hash of the URI portions of the RECORD-ROUTE header set stored in memory. The RECORD-ROUTE signature may be inserted 954 as a header parameter into the RECORD-ROUTE header for the SIP node 300. The server 1300 may store 956 the RECORD-ROUTE session key in the key database discussed above with reference to FIG. 9 and may initialize and/or update the key parameters such as the key identifier, the key date/time creation, the expiration date/time, and/or the encrypted key. Whether or not the message is a request, the SIP server may determine 942 if there is one CONTACT header within the received message. If not, then standard processing may continue; otherwise, the SIP node may construct 958 the ROUTE header set from the RECORD-ROUTE header set and the CONTACT header. The SIP server may then identify 960 the ROUTE SET session key, and using that key may generate 962 the ROUTE SET signature, which may then be inserted 964 as a URI parameter into the RECORD-ROUTE header of the SIP node 300. The SIP node may save 966 the ROUTE SET session key and key parameters in the key database as discussed above. The SIP server may then proceed with standard processing of the message.

Figure 13:
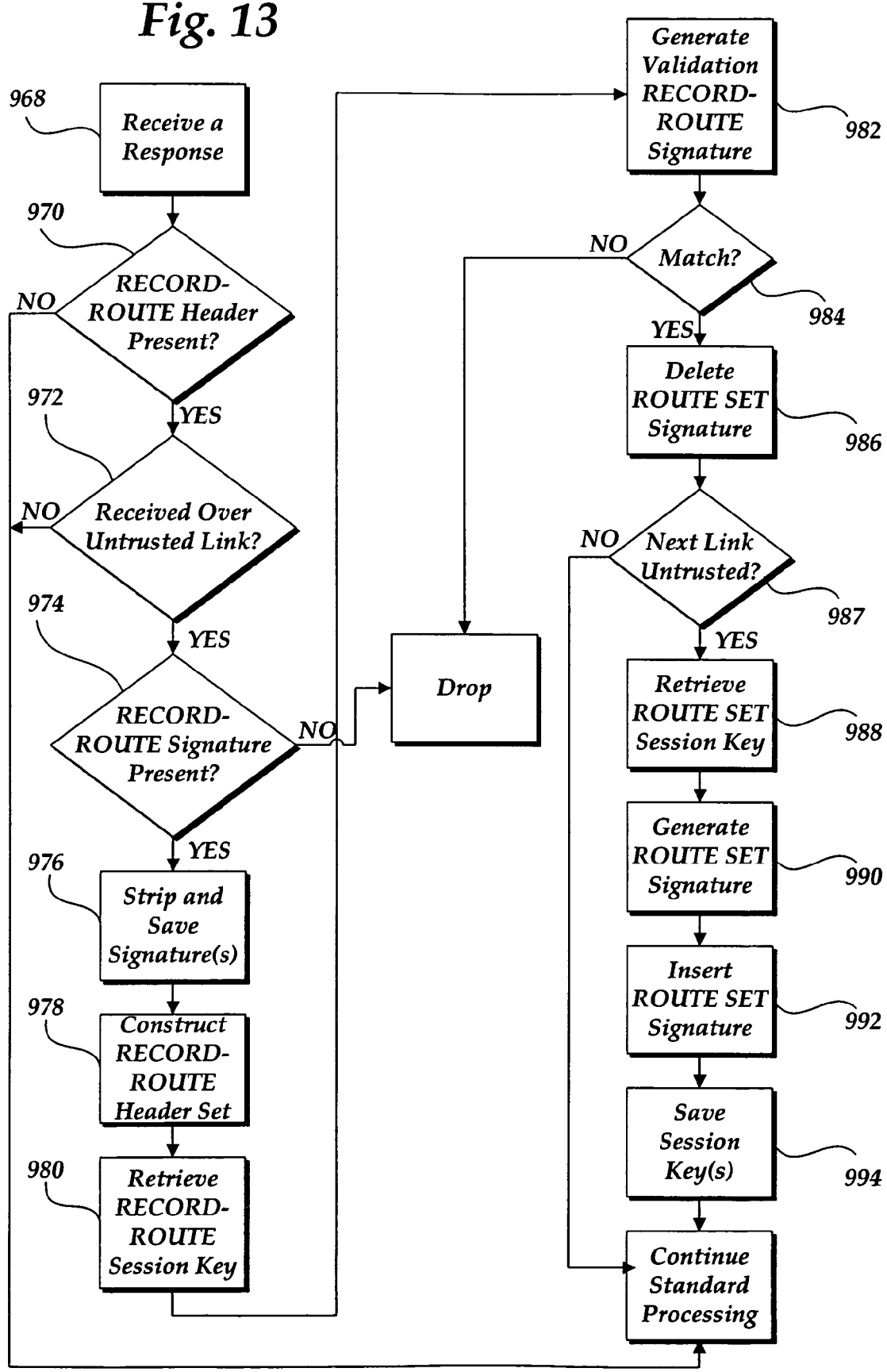
FIG. 13 is a flowchart describing how to verify a RECORD-ROUTE signature in accordance with one embodiment of the invention.
Figure 14:
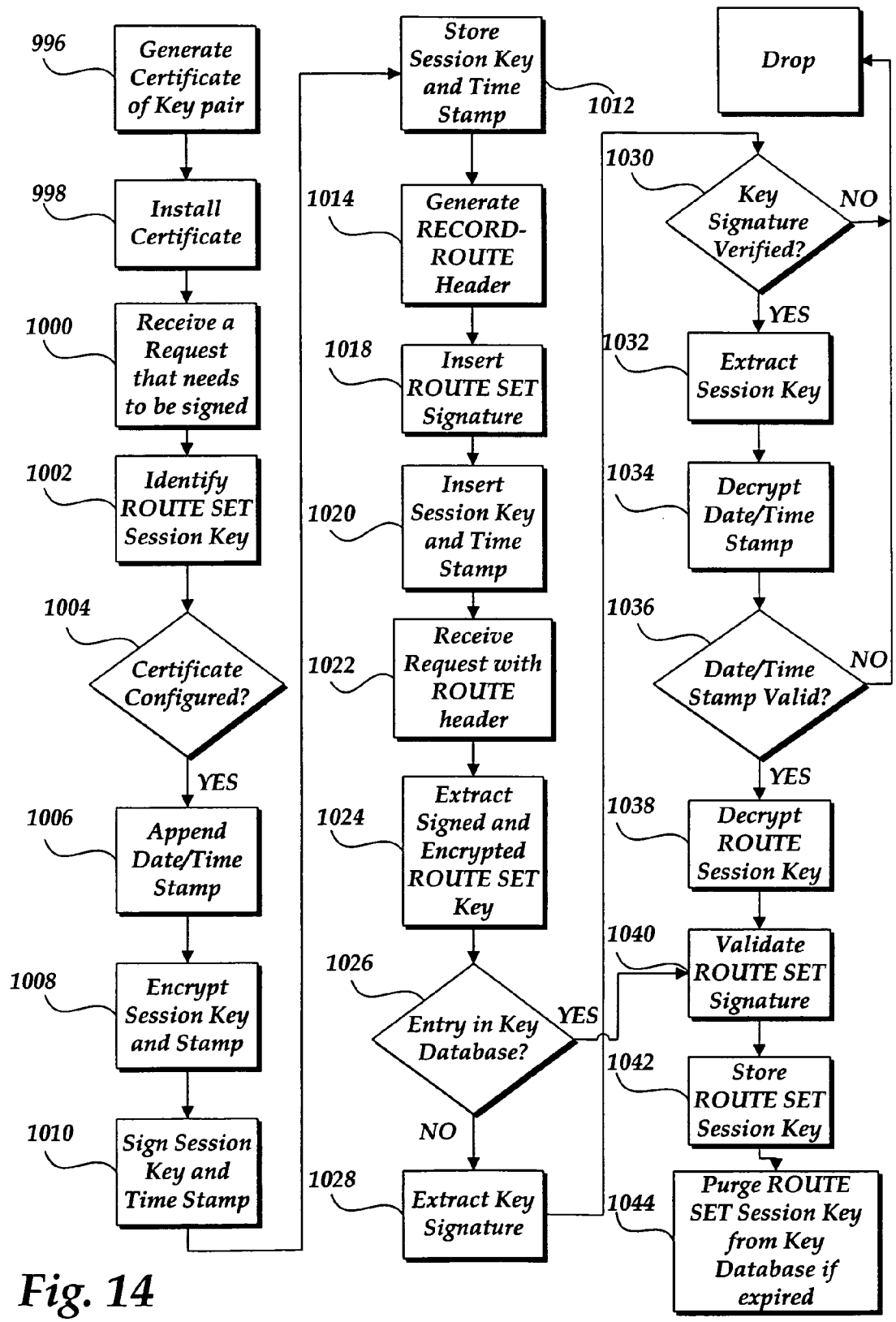
FIG. 14 is a flowchart describing how a session key may be imported into a server in a pool of servers in accordance with one embodiment of the invention.

Referring to FIG. 13, validation of the RECORD-ROUTE signature may occur when the SIP node receives 968 a response. The SIP node may determine 970 if there are any RECORD-ROUTE headers present in the message. If not, then standard processing of the message may continue; otherwise, the SIP node may determine 972 if the response was received over an untrusted link. If the link is trusted, then standard processing of the message may continue. If the link is untrusted then, the SIP node may determine 974 if the RECORD-ROUTE header for the SIP node contains a RECORD-ROUTE signature. If not, then the message may be dropped from the processing stack of SIP node 300. If the RECORD-ROUTE signature is present, then the SIP node server may strip and save 976 all signatures within the RECORD-ROUTE header of SIP node 300. For example, the RECORD-ROUTE header for SIP node 300 may contain both a RECORD-ROUTE signature as well as a ROUTE SET signature. Either may be listed first in the RECORD-ROUTE URI parameters as long their placement is consistent throughout the dialog and/or the signatures are identified in a suitable manner to distinguish the multiple signatures. For example, each signature inserted into a header with multiple signatures may include an identifier specifying the type of header and/or each signature may be accompanied by an additional parameter identifying the type of signature inserted. The SIP node may construct 978 the RECORD-ROUTE header set containing the URI portions of the RECORD-ROUTE headers in the headers of the message. The SIP node may also retrieve 980 the appropriate RECORD-ROUTE session key in accordance with the procedures discussed above with respect to operation 930 of FIG. 11. The SIP node may generate 982 the validation RECORD-ROUTE signature based upon the RECORD-ROUTE header set and the session key, and then compare 984 the validation RECORD-ROUTE signature with the stored RECORD-ROUTE signature. If the signatures do not match, then the SIP node may drop the message from its processing stack. If the signatures match, then standard processing may continue. If a ROUTE SET signature was present as a URI parameter of the RECORD-ROUTE header, the SIP node server may delete 986 this signature from the message and/or memory. More particularly, the callee ROUTE SET signatures have been saved by the callee SIP node, and thus, are no longer required in the present message being directed toward the caller. To determine if a new ROUTE SET signature for the caller should be generated and transmitted to the callee, the SIP node may determine 987 if the next SIP node is through an untrusted link and there is at least one CONTACT header. If not, then standard processing of the message may continue. If the next link is untrusted, then the SIP node server may generate the caller ROUTE SET signature by retrieving 988 a ROUTE SET session key, which may be the same key as the RECORD-ROUTE key. Using that key, the SIP node may generate 990 the ROUTE SET signature based upon the RECORD-ROUTE header set and the URI portion of the first listed CONTACT header. The ROUTE SET signature may be inserted 992 into the RECORD-ROUTE header for the SIP node 300 to be transferred to the caller SIP node 102. The SIP node may save 994 the ROUTE SET session key and/or RECORD-ROUTE session key and key parameters in the key database as discussed above. The SIP server may then proceed with standard processing of the message. The validation of the callee ROUTE SET signature and/or the caller ROUTE SET signature in subsequent requests may follow a similar process as described.

FIG. 14 illustrates the operations in one example implementation for transferring a session key between servers within a pool of servers. For example, as noted above, SIP node 300 may be provided by a server 300A and a server 300B. In this manner, SIP node 300A may generate a signature with a session key and SIP node 300B may then be required to validate that signature. Although the following example is described with reference to ROUTE SET headers, a similar process may be used to encrypt, sign, and access the RECORD-ROUTE session key and/or the VIA session key.

As shown in FIG. 14, a common certificate of a public/private key pair may be generated 996 and installed 998 on each server (300A, 300B) within the server pool. As noted above, the public/private key pair may be used to sign and encrypt all session keys processed by that node, or each type of session key (VIA, RECORD-ROUTE and/or ROUTE SET) may have a distinct public/private key pair. In operation, the SIP node 300A may receive 1000 a request which needs to be signed. As noted above, the SIP node server may identify 1002 the ROUTE SET session key by generating, accessing or retrieving it. The SIP node may also verify 1004 that the certificate is configured for routing information regarding key exchange. The SIP server may determine the date/time stamp of the creation of the ROUTE SET session key and append 1006 the date/time stamp to the session key. Using the public key, the SIP server may encrypt 1008 the session key and date/time stamp and sign 1010 the result with the private key. The result of the encrypted and signed session key may be stored 1012 in the key database described above with reference to FIG. 9 along with the key parameters such as the date/time stamp, the session key, a session key identifier, and the like. Using the ROUTE SET session key, the SIP node may generate the ROUTE SET signature as described above with reference to FIG. 12, and generate 1014 the RECORD-ROUTE header for the SIP node 300. The SIP node server may insert 1018 the ROUTE SET signature into the RECORD-ROUTE header for the SIP node and may also insert 1020 the signed and encrypted ROUTE SET session key as URI parameters in the SIP node RECORD-ROUTE header.

After the callee has received the request, it will save the URI portions of the RECORD-ROUTE headers and the CONTACT header in a set of ROUTE headers. When the callee SIP node generates a subsequent in-dialog request, the callee SIP node may include the ROUTE SET headers which echo the RECORD-ROUTE and CONTACT headers containing the ROUTE SET signature and ROUTE SET session key generated by SIP node 300A. The second SIP node 300B may receive 1022 the in-dialog request with at least one ROUTE header. In view of retrieving 930 the appropriate session key described above with reference to FIG. 12, the SIP node may extract 1024 the signed and encrypted ROUTE SET session key from the ROUTE header and compare 1026 the signed and encrypted key with entries in the key database to determine if the server node 300B has access to the decrypted session key. If there is a match, the SIP node 300B may use the session key from the key database to validate the ROUTE SET signature in the ROUTE header. If there is no match, the SIP node may extract 1028 the key signature and verify 1030 the key signature with the public key. If the signature is not verified, the SIP node may drop the message from its processing stack or take any other suitable action. If the signature does match, the encrypted session key may be extracted 1032. The date/time stamp may be decrypted 1034 separately from the session key to minimize server resources if the key is no longer active (e.g., expired). More particularly, the SIP node may validate 1036 the date/time stamp after decryption to verify that the date/time stamp is within the configuration lifetime for that type of session key. If the date/time stamp cannot be verified, the message may be dropped from the processing stack. If the date/time stamp is verified, then the session key may be decrypted 1038 with the private key and then used to validate 1040 the ROUTE SET signature. The result of the decrypted session key may be stored 1042 in the key database described above with reference to FIG. 9 along with the key parameters such as the date/time stamp, the signed and encrypted session key, a session key identifier, and the like. At some time, the session key may expire and the database records for that session key, including the session key, the signed and encrypted session key, and the like maybe purged 1044 from the key database, such as, when that dialog is complete, no more headers using that session key are expected, at the end of the active lifetime of the session key, and/or after its expiration date.

The computer system, with which the various elements of the SIP nodes of FIGS. 1 and/or 8 may be implemented either individually or in combination, typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

The computing devices illustrated in FIGS. 1 and/or 8 typically include some form of computer readable media. Computer readable media can be any available media that can be accessed by the other computing devices in the SIP server. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing systems in the SIP node. Communication media typically embodies computer readable instructions, data structures, program modules or other data in a modulated data signal such as a carrier wave or other transport mechanism and includes any data in a modulated data signal such as a carrier wave or other transport mechanism and includes any information delivery media. By way of example, and not limitation, communication media includes wired media such as wired network or direct-wired connection, and wireless media such as acoustic, RF, infrared, and other wireless media. Combinations of any of the above should also be included within the scope of computer readable media.

One or more output devices and one or more input devices may be connected to the computer system. The invention is not limited to the particular input or output devices used in combination with the computer system or to those described herein.

The computer system may be a general purpose computer system which is programmable using a computer programming language, such as SmallTalk, C++, Java, Ada, or C#(C-sharp), or other language, such as a scripting language or even assembly language. Various aspects of the invention may be implemented in a non-programmed environment (e.g., documents created in HTML, XML or other format that when viewed in a window of a browser program, render aspects of a graphical user interface or perform other functions). Various aspects of the invention may be implemented as programmed or non-programmed elements, or any combination thereof. The computer system may also be specially programmed, special purpose hardware, or an application specific integrated circuit (ASIC). The reader system may also include a pager, telephone, personal digital assistant or other electronic data communication device.

In a general purpose communication system, the processor is typically a commercially available processor such as the well-known Pentium® processor available from the Intel Corporation. Many other processors are available. Such a processor usually executes an operating system which may be, for example, the Windows 95®, Windows 98®, Windows NT®, Windows 2000® or Windows XP® available from Microsoft Corporation, MAC OS System X available from Apple Computer, the Solaris Operating System available from Sun Microsystems, or UNIX available from various sources. Many other operating systems may be use.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., SIP or TCP/IP). It should be appreciated that the invention is not limited to executing on any particular system or group of systems.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which opera- tions of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A method of processing a Session Initiation Protocol (SIP) message, the method comprising:
   receiving a SIP request at a SIP node, the SIP request including a message header including data indicative of network routing locations;
   determining a RECORD-ROUTE header of the SIP request;
   editing the data at the SIP node;
   generating a signature based upon at least a portion of the message header including the edited data;
   generating a SIP node header entry; and
   inserting the signature into the SIP node header entry;
   wherein generating the signature includes generating the signature based upon at least a portion of the RECORD-ROUTE header of the SIP request; and
   wherein inserting the signature includes inserting the signature into a RECORD-ROUTE header of the SIP node.

2. The method of claim 1, wherein the SIP node header entry is an echoed header.

3. The method of claim 1, wherein inserting the signature includes inserting the signature as a header parameter of the RECORD-ROUTE header of the SIP node.

4. The method of claim 1, further comprising:
   receiving a SIP response at the SIP node in reply to the SIP request, the SIP response comprising the RECORD-ROUTE header for the SIP node which includes a third received signature; and
   verifying the third received signature.

5. The method of claim 1, further comprising:
   determining a next link to a next SIP node to receive the SIP request; and
   determining if the next link to the next SIP node is an untrusted link, wherein generating the third signature includes only generating the third signature if the next link is an untrusted link.

6. A method of processing a Session Initiation Protocol (SIP) message, the method comprising:
   receiving a SIP request at a SIP node, the SIP request including a message header;
   generating a signature based upon at least a portion of the message header;
   generating a SIP node header entry, wherein the SIP node header entry is a VIA header;
   inserting the signature into the SIP node header entry;
   receiving a SIP response at the SIP node in reply to the SIP request, the SIP response comprising the VIA header for the SIP node, the VIA header including a first received signature;
   verifying the first received signature;
   determining a next link to a next SIP node to receive the SIP request; and
   determining if the next link to the next SIP node is an untrusted link, wherein generating the first signature includes only generating the first signature if the next link is an untrusted link.

7. A method of processing a Session Initiation Protocol (SIP) message, the method comprising:
   receiving a SIP request at a SIP node, the SIP request including a message header;
   generating a signature based upon at least a portion of the message header;

generating a SIP node header entry;
inserting the signature into the SIP node header entry;
receiving a SIP response in reply to the SIP request, the SIP response including a response header;
generating another signature based upon a RECORD-ROUTE header and a CONTACT header of the response header;
inserting the other signature into a RECORD-ROUTE header of the SIP node of the response; and
before generating the other signature, removing an existing signature from the SIP node header entry.

8. A computer storage medium having computer executable instructions for performing steps for processing messages in a pool of servers having a first server and a second server which are constructed and arranged to be interchangeably used to process messages in the same dialog, the steps comprising:

identifying, at the first server, a public key and a private key;
receiving, at the first server, a first message including a first header;
generating a session key;
encrypting the session key with the private key;
generating, with the public key, a key signature based on the encrypted session key;
inserting the key signature into the first header; and
identifying a time stamp containing data representing a date and time of creation for the session key and appending the time stamp to the session key, wherein encrypting the session key includes encrypting the session key and the time stamp.

9. The computer storage medium of claim 8, further comprising:

identifying, at the second server, the public key and the private key;
receiving, at the second server, a second message including a second header, the second header comprising the key signature;
decrypting the key signature to determine the session key.

10. The computer storage medium of claim 9, further comprising:

verifying at least a portion of the second message with the session key.

11. The computer storage medium of claim 8, wherein the first message is a Session Initiation Protocol (SIP) message.

12. The computer storage medium of claim 8, wherein the first server is a proxy server.

* * * * *